US009141019B2

United States Patent
Kosaka

(10) Patent No.: US 9,141,019 B2
(45) Date of Patent: Sep. 22, 2015

(54) POWER-SUPPLY DEVICE AND IMAGE FORMATION APPARATUS

(71) Applicant: Oki Data Corporation, Tokyo (JP)

(72) Inventor: Toru Kosaka, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/462,630

(22) Filed: Aug. 19, 2014

(65) Prior Publication Data

US 2015/0055972 A1  Feb. 26, 2015

(30) Foreign Application Priority Data

Aug. 23, 2013  (JP) .................................. 2013-173452

(51) Int. Cl.

| G03G 15/14 | (2006.01) |
|---|---|
| G03G 15/02 | (2006.01) |
| H02M 3/335 | (2006.01) |
| G03G 15/00 | (2006.01) |

(52) U.S. Cl.
CPC ............ *G03G 15/0283* (2013.01); *G03G 15/80* (2013.01); *H02M 3/33507* (2013.01)

(58) Field of Classification Search
CPC .......................... H02M 3/33507; G03G 15/80
USPC ...................................................... 363/21.17
See application file for complete search history.

(56) References Cited

U.S. PATENT DOCUMENTS

| 5,530,340 | A | * | 6/1996 | Hayakawa et al. | ............ 323/314 |
| 7,599,202 | B2 | * | 10/2009 | Fukumoto | ...................... 363/131 |
| 7,626,366 | B2 | * | 12/2009 | Koyama et al. | ............... 323/268 |
| 8,760,887 | B2 | * | 6/2014 | Inoue | .............................. 363/16 |

FOREIGN PATENT DOCUMENTS

| JP | S55-12710 U | 1/1980 |
| JP | H01-76184 U | 5/1989 |
| JP | 2001-169546 A | 6/2001 |
| JP | 2001-190067 A | 7/2001 |
| JP | 2003-272887 A | 9/2003 |
| JP | 2006-201351 A | 8/2006 |
| JP | 2013-005650 A | 1/2013 |
| JP | 2013-042624 A | 2/2013 |

* cited by examiner

*Primary Examiner* — Clayton E Laballe
*Assistant Examiner* — Leon W Rhodes, Jr.
(74) *Attorney, Agent, or Firm* — Marvin A. Motsenbocker; Mots Law, PLLC

(57) ABSTRACT

A power-supply device includes: a rectifier circuit configured to output a rectified voltage by rectifying an output from a transformer; a comparator circuit configured to compare a comparison voltage corresponding to an output voltage or an output current that are generated based on the rectified voltage with the indicator voltage and to control an operation of the transformer drive circuit so as to reduce the difference between the comparison voltage and the indicator voltage; a constant voltage element configured to limit the output voltage or the output current by operating as a constant voltage source when the value of the output voltage or the output current reaches a threshold; and a current mirror circuit. The current mirror circuit is configured to lower the indicator voltage by allowing a current proportional to the current flowing through the constant voltage element to flow through the current path.

15 Claims, 25 Drawing Sheets

Fig.7

NO-LOAD STATE

| DAC SET VALUE | DAC VOLTAGE (V) | INDICATOR CURRENT (μA) | OUTPUT VOLTAGE (V) | OUTPUT CURRENT (μA) | INPUT VOLTAGE (V) |
|---|---|---|---|---|---|
| 10hex | 0.21 | 4 | 3680 | 0 | 0.19 |
| 20hex | 0.41 | 8 | 5480 | 0 | 0.31 |
| 30hex | 0.62 | 12 | 5560 | 0 | 0.38 |
| 40hex | 0.83 | 16 | 5640 | 0 | 0.44 |
| 50hex | 1.04 | 20 | 5700 | 0 | 0.51 |
| 60hex | 1.24 | 24 | 5760 | 0 | 0.57 |
| 70hex | 1.45 | 28 | 5840 | 0 | 0.64 |
| 80hex | 1.66 | 32 | 5900 | 0 | 0.70 |
| 90hex | 1.86 | 36 | 5960 | 0 | 0.77 |
| A0hex | 2.07 | 40 | 6020 | 0 | 0.84 |
| B0hex | 2.28 | 44 | 6100 | 0 | 0.90 |
| C0hex | 2.48 | 48 | 6160 | 0 | 0.97 |
| D0hex | 2.69 | 52 | 6220 | 0 | 1.04 |
| E0hex | 2.90 | 56 | 6300 | 0 | 1.10 |
| F0hex | 3.11 | 60 | 6360 | 0 | 1.17 |
| FFhex | 3.30 | 64 | 6420 | 0 | 1.23 |

Fig.8

LOAD RESISTANCE 50 MΩ

| DAC SET VALUE | DAC VOLTAGE (V) | INDICATOR CURRENT (μA) | OUTPUT VOLTAGE (V) | OUTPUT CURRENT (μA) | INPUT VOLTAGE (V) |
|---|---|---|---|---|---|
| 10hex | 0.21 | 4 | 170 | 3.4 | 0.19 |
| 20hex | 0.41 | 8 | 360 | 7.2 | 0.37 |
| 30hex | 0.62 | 12 | 550 | 11.0 | 0.56 |
| 40hex | 0.83 | 16 | 730 | 14.6 | 0.74 |
| 50hex | 1.04 | 20 | 900 | 18.0 | 0.93 |
| 60hex | 1.24 | 24 | 1080 | 21.6 | 1.11 |
| 70hex | 1.45 | 28 | 1270 | 25.4 | 1.29 |
| 80hex | 1.66 | 32 | 1450 | 29.0 | 1.47 |
| 90hex | 1.86 | 36 | 1640 | 32.8 | 1.66 |
| A0hex | 2.07 | 40 | 1830 | 36.6 | 1.85 |
| B0hex | 2.28 | 44 | 2020 | 40.4 | 2.03 |
| C0hex | 2.48 | 48 | 2200 | 44.0 | 2.21 |
| D0hex | 2.69 | 52 | 2380 | 47.6 | 2.40 |
| E0hex | 2.90 | 56 | 2580 | 51.6 | 2.58 |
| F0hex | 3.11 | 60 | 2760 | 55.2 | 2.76 |
| FFhex | 3.30 | 64 | 2940 | 58.8 | 2.94 |

Fig.9

LOAD RESISTANCE 100 MΩ

| DAC SET VALUE | DAC VOLTAGE (V) | INDICATOR CURRENT (µA) | OUTPUT VOLTAGE (V) | OUTPUT CURRENT (µA) | INPUT VOLTAGE (V) |
|---|---|---|---|---|---|
| 10hex | 0.21 | 4 | 330 | 3.3 | 0.19 |
| 20hex | 0.41 | 8 | 690 | 6.9 | 0.37 |
| 30hex | 0.62 | 12 | 1020 | 10.2 | 0.56 |
| 40hex | 0.83 | 16 | 1380 | 13.8 | 0.74 |
| 50hex | 1.04 | 20 | 1740 | 17.4 | 0.93 |
| 60hex | 1.24 | 24 | 2100 | 21.0 | 1.11 |
| 70hex | 1.45 | 28 | 2440 | 24.4 | 1.29 |
| 80hex | 1.66 | 32 | 2800 | 28.0 | 1.48 |
| 90hex | 1.86 | 36 | 3140 | 31.4 | 1.66 |
| A0hex | 2.07 | 40 | 3500 | 35.0 | 1.85 |
| B0hex | 2.28 | 44 | 3840 | 38.4 | 2.03 |
| C0hex | 2.48 | 48 | 4200 | 42.0 | 2.21 |
| D0hex | 2.69 | 52 | 4540 | 45.4 | 2.40 |
| E0hex | 2.90 | 56 | 4900 | 49.0 | 2.58 |
| F0hex | 3.11 | 60 | 5020 | 50.2 | 2.68 |
| FFhex | 3.30 | 64 | 5080 | 50.8 | 2.76 |

Fig.10

LOAD RESISTANCE 200 MΩ

| DAC SET VALUE | DAC VOLTAGE (V) | INDICATOR CURRENT (μA) | OUTPUT VOLTAGE (V) | OUTPUT CURRENT (μA) | INPUT VOLTAGE (V) |
|---|---|---|---|---|---|
| 10hex | 0.21 | 4 | 600 | 3.0 | 0.19 |
| 20hex | 0.41 | 8 | 1250 | 6.3 | 0.37 |
| 30hex | 0.62 | 12 | 1910 | 9.6 | 0.56 |
| 40hex | 0.83 | 16 | 2560 | 12.8 | 0.74 |
| 50hex | 1.04 | 20 | 3200 | 16.0 | 0.93 |
| 60hex | 1.24 | 24 | 3840 | 19.2 | 1.11 |
| 70hex | 1.45 | 28 | 4500 | 22.5 | 1.29 |
| 80hex | 1.66 | 32 | 5140 | 25.7 | 1.48 |
| 90hex | 1.86 | 36 | 5260 | 26.3 | 1.56 |
| A0hex | 2.07 | 40 | 5320 | 26.6 | 1.64 |
| B0hex | 2.28 | 44 | 5380 | 26.9 | 1.71 |
| C0hex | 2.48 | 48 | 5440 | 27.2 | 1.79 |
| D0hex | 2.69 | 52 | 5520 | 27.6 | 1.86 |
| E0hex | 2.90 | 56 | 5560 | 27.8 | 1.93 |
| F0hex | 3.11 | 60 | 5620 | 28.1 | 2.01 |
| FFhex | 3.30 | 64 | 5680 | 28.4 | 2.08 |

POWER-SUPPLY DEVICE AND IMAGE FORMATION APPARATUS

CROSS REFERENCE TO RELATED APPLICATIONS

This application claims priority based on 35 USC 119 from prior Japanese Patent Application No. 2013-173452 filed on Aug. 23, 2013, entitled "POWER-SUPPLY DEVICE AND IMAGE FORMATION APPARATUS", the entire contents of which are incorporated herein by reference.

BACKGROUND OF THE INVENTION

1. Field of the Invention

This disclosure relates to a power-supply device using a transformer and an image formation apparatus including the power-supply device, and more particularly relates to a power-supply device used in electrophotographic equipment and an image formation apparatus including the power-supply device.

2. Description of Related Art

A high-voltage power supply using a transformer, such as an electromagnetic transformer or a piezoelectric transformer, is widely used in an electrophotographic image formation apparatus. An electrophotographic image formation process includes a series of steps including: a charge step of uniformly charging a surface of a photoconductor; an exposure step of forming an electrostatic latent image by irradiating the surface of the photoconductor with light; a development step of forming a developer image on the photoconductor by allowing a charged developer to adhere to the electrostatic latent image; a transfer step of transferring the developer image onto a recording medium such as paper; and a fixing step of fixing the transferred developer image to the recording medium. The high-voltage power supply can supply a bias voltage to the members (loads) used in such an image formation process.

For example, Patent Document 1 (Japanese Patent Application Publication No. 2006-201351 (e.g., FIG. 1 and Paragraphs [0046] to [0055] and FIG. 14 and Paragraphs [0083] to [0098])) discloses a high-voltage power supply using a piezoelectric transformer. The high-voltage power supply disclosed in Patent Document 1 supplies a load, such as a transfer roller, with an output voltage or an output current corresponding to an inputted target voltage value. The high-voltage power supply has a protection function to detect an overcurrent or overvoltage and lower the target voltage value when the overcurrent or overvoltage is supplied to the load due to a change in electrical characteristics of the load. When the protection function operates to lower the target voltage value, the output voltage or the output current is lowered.

SUMMARY OF THE INVENTION

In the conventional high-voltage power supply, when an anomaly that causes an overvoltage or overcurrent in the electrical characteristics of the load occurs and continues for a certain period of time, activation (ON) and stop (OFF) of the protection function may be repeated. More specifically, while the anomaly is continuing, the following series of operations is repeated: the protection function is activated; then the protection function is stopped when an overvoltage state or overcurrent state is solved; the output voltage or output current increases due to the stop of the protection function; and the protection function is activated again.

For example, when a load such as an elastic member falls into a low-temperature state under the influence of ambient temperature, the impedance of the load may be so increased that the protection function may be intermittently activated (repeated activation and stop of the protection function). Moreover, such intermittent activation may occur also when time degradation of the load causes an anomaly in the electrical characteristics of the load. When such intermittent activation occurs in the image formation apparatus, the output voltage or the output current becomes unstable and oscillates. This leads to a problem of poor image quality of the printed images.

It is an object of an embodiment of the invention to protect a load from an overvoltage or overcurrent without causing intermittent activation.

An aspect of the invention is a power-supply device that includes: a rectifier circuit configured to output a rectified voltage by rectifying an output from a transformer; a comparator circuit configured to compare a comparison voltage, corresponding to an output voltage or an output current that are generated based on the rectified voltage, with the indicator voltage and to control the operation of the transformer drive circuit so as to reduce the difference between the comparison voltage and the indicator voltage; a constant voltage element configured to limit the output voltage or the output current by operating as a constant voltage source when a value of the output voltage or the output current reaches a threshold; and a current mirror circuit. The current mirror circuit is configured to lower the indicator voltage by allowing a current proportional to a current flowing through the constant voltage element to flow through the current path.

According to this aspect of the invention, overvoltage protection or overcurrent protection can be realized by stabilizing an output waveform to the load without oscillation even when the load continues to have an anomaly in its electrical characteristics.

BRIEF DESCRIPTION OF THE DRAWINGS

FIG. 7 is a table showing the characteristic values obtained in a no-load state for the positive bias supply in FIG. 6.

FIG. 8 is a table showing the characteristic values obtained with a load resistance of 50 MΩ for the positive bias supply in FIG. 6.

FIG. 9 is a table showing the characteristic values obtained with a load resistance of 100 MΩ for the positive bias supply in FIG. 6.

FIG. 10 is a table showing the characteristic values obtained with a load resistance of 200 MΩ for the positive bias supply in FIG. 6.

DETAILED DESCRIPTION OF EMBODIMENTS

Figure 1:
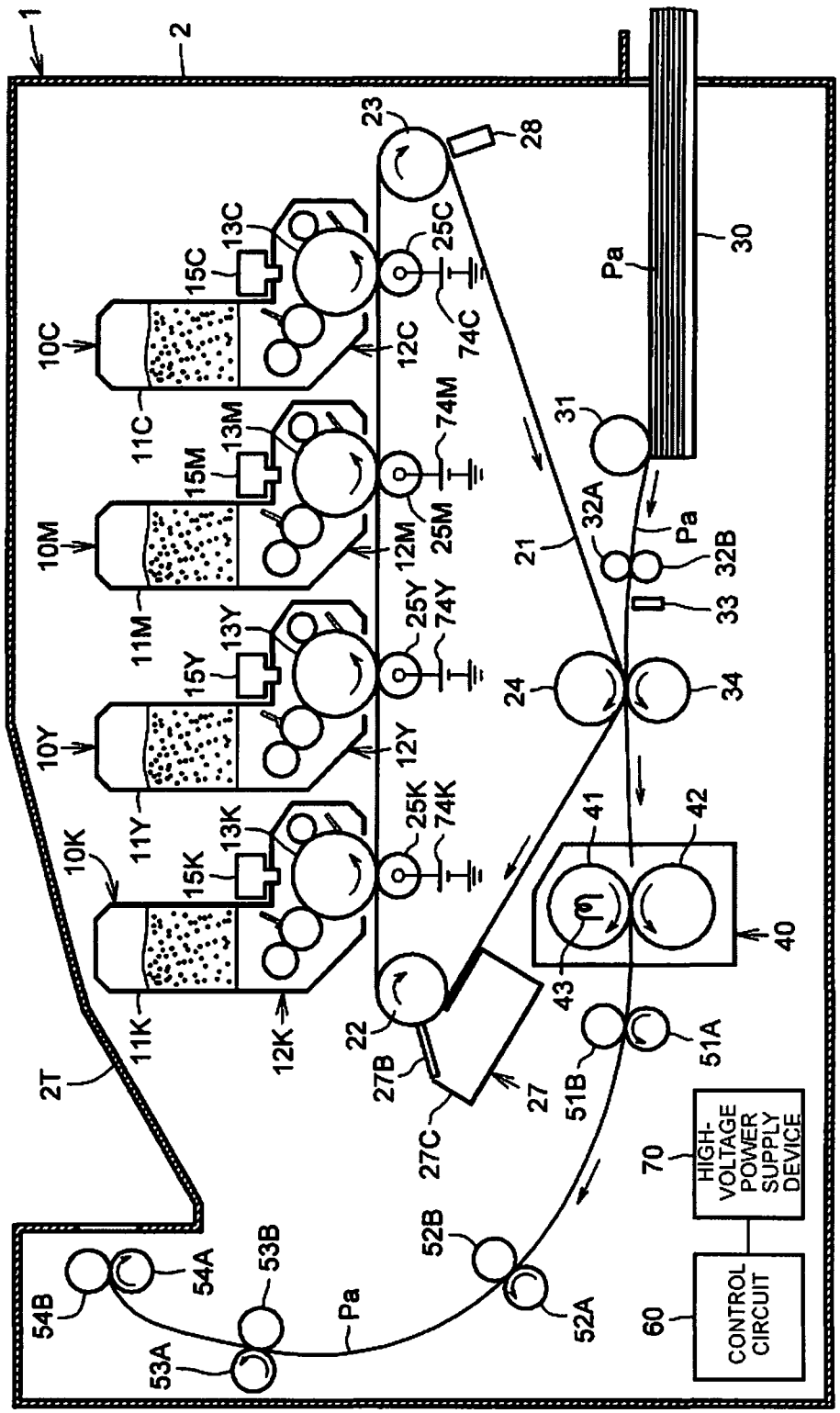
FIG. 1 is a diagram schematically illustrating the main configuration of an image formation apparatus of Embodiment 1 according to the invention.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

With reference to the drawings, various embodiments according to the invention are described below. In the following description, constituent elements having the same functions are denoted by the same reference numerals throughout the drawings.

Embodiment 1

FIG. 1 is a diagram schematically illustrating the main configuration of image formation apparatus 1 of Embodiment 1 according to the invention. Image formation apparatus 1 operates according to an electrophotographic system, and has a function to transfer a developer image onto a print medium by using an intermediate transfer method. The intermediate transfer method is a method wherein a developer image formed on an image carrier, such as a photosensitive drum, is primarily transferred onto an intermediate transfer body and then is secondarily transferred onto the print medium from the intermediate transfer body.

As illustrated in FIG. 1, image formation apparatus 1 has housing 2 and includes, in housing 2: image formation units 10K, 10Y, 10M and 10C configured to form developer images of different colors; intermediate transfer belt 21 serving as an intermediate transfer body; primary transfer rollers 25K, 25Y, 25M and 25C configured to transfer the developer images onto intermediate transfer belt 21 from image formation units 10K, 10Y, 10M and 10C; positive bias supplies 74K, 74Y, 74M and 74C configured to supply a transfer bias to primary transfer rollers 25K, 25Y, 25M and 25C; concentration sensor 28 configured to detect a concentration of a developer on intermediate transfer belt 21; secondary transfer roller 24 included in a secondary transfer unit; belt cleaning unit 27 configured to recover the developer remaining on intermediate transfer belt 21 without being secondarily transferred; control circuit 60 configured to control the entire operations of image formation apparatus 1; and high-voltage power supply device 70.

For convenience of illustration, positive bias supplies 74K, 74Y, 74M and 74C and high-voltage power supply device 70 are separately illustrated in FIG. 1. However, as described later, positive bias supplies 74K, 74Y, 74M and 74C are a part of the constituent elements of high-voltage power supply device 70.

Moreover, image formation apparatus 1 also includes: medium storage cassette 30 capable of storing sheet-shaped print medium Pa that is a material that the developer image is to be transferred onto; hopping roller 31 configured to take out print medium Pa one by one from medium storage cassette 30; a pair of registration rollers 32A and 32B configured to convey print medium Pa taken out from medium storage cassette 30 to the secondary transfer unit; medium detection sensor 33; fixer 40 configured to fix the secondarily transferred developer image to print medium Pa; conveyance rollers 51A, 51B, 52A, 52B, 53A and 53B configured to convey print medium Pa sent from fixer 40; and discharge rollers 54A and 54B configured to discharge print medium Pa onto tray 2T. Here, conveyance rollers 51A, 51B, 52A, 52B, 53A and 53B are arranged along a conveyance guide (not illustrated) for guiding print medium Pa.

Hopping roller 31 and the pair of registration rollers 32A and 32B are rotated by the power transmitted from an unillustrated drive motor to send print medium Pa, taken out from medium storage cassette 30, to the secondary transfer unit through medium detection sensor 33. Here, medium detection sensor 33 detects the passage of print medium Pa in a contact or non-contact state with print medium Pa, and gives the detection result to control circuit 60.

Note that medium storage cassette 30 is detachably attached to image formation apparatus 1 and can store a number of sheets of print media Pa in a stacked state. Examples of print medium Pa include, but are not limited to, a sheet-shaped medium such as paper, synthetic paper, cardboard, special paper, a plastic film and a fabric.

Figure 2:
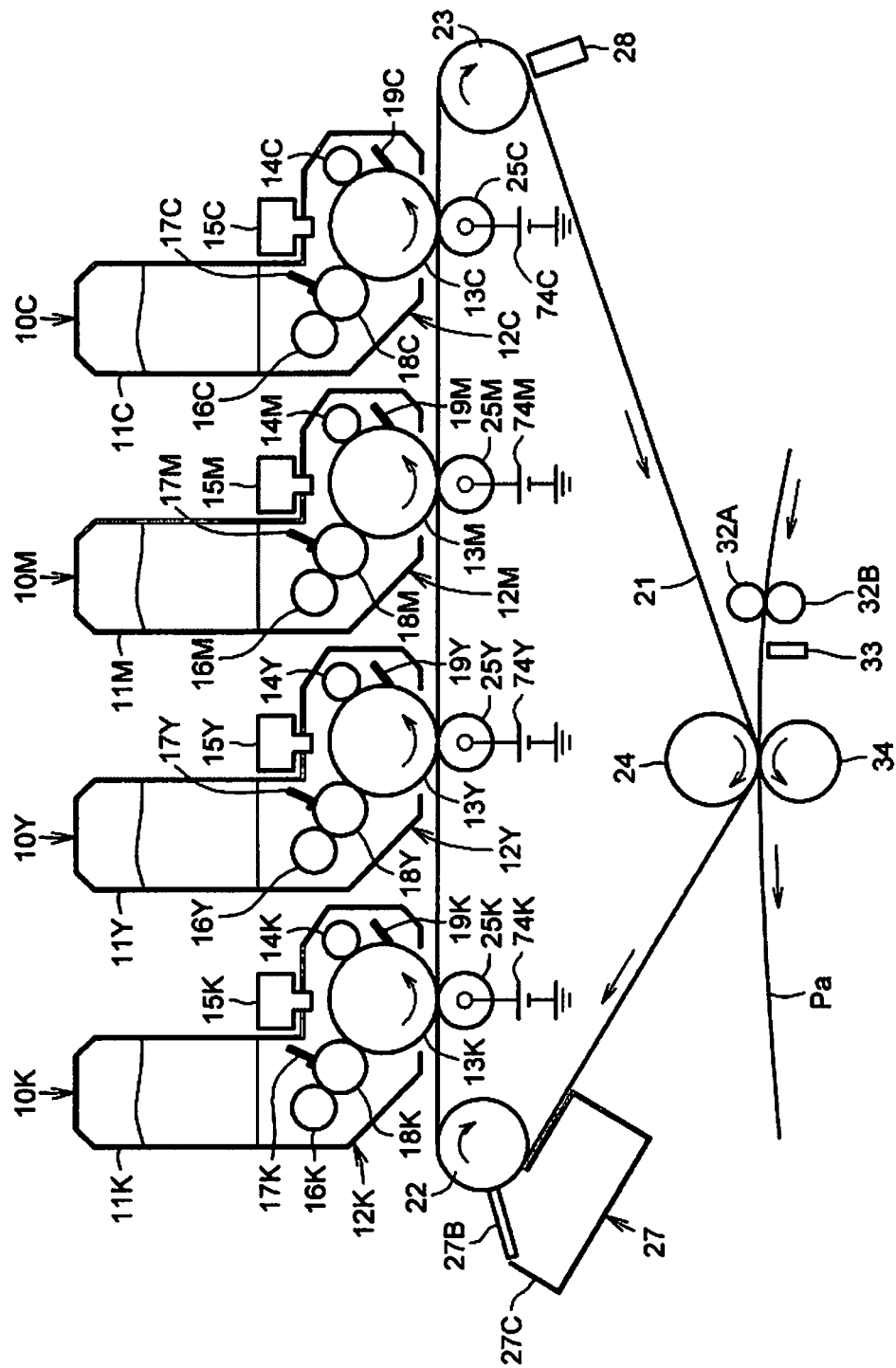
FIG. 2 is a diagram schematically illustrating a configuration including image formation units, a primary transfer unit and a secondary transfer unit according to Embodiment 1.

FIG. 2 is a diagram schematically illustrating a configuration including image formation units 10K, 10Y, 10M and 10C, a primary transfer unit and the secondary transfer unit according to this embodiment.

Intermediate transfer belt 21 is an endless elastic belt made of a resin material such as polyimide resin, for example. Intermediate transfer belt 21 is stretched around drive roller 23, tension roller 22 and secondary transfer roller 24. Drive roller 23 is rotated clockwise by the power transmitted from the drive motor (not illustrated) and thus can circulate intermediate transfer belt 21. Tension roller 22 is biased by an elastic member such as a coil spring and thus can apply proper tension to the entire intermediate transfer belt 21.

Image formation units 10K, 10Y, 10M and 10C have functions to form images made of black (K), yellow (Y), magenta (M) and cyan (C) developers (e.g., powder toners), i.e., developer images, respectively. Image formation unit 10K for black image includes: toner cartridge (developer container) 11K configured to store a black developer; and development device 12K. Toner cartridge 11K has a structure that is detachable from developing member 12K and is capable of supplying the developer to development device 12K.

Development device 12K includes: photosensitive drum 13K that is an image carrier; charging roller 14K as a charging unit configured to uniformly charge a surface of photosensitive drum 13K; LED head (exposure unit) 15K configured to form an electrostatic latent image by exposing charged photosensitive drum 13K; developing roller 18K that is a developer carrier; feed roller 16K configured to apply the developer supplied from the toner cartridge 11K to a surface of developing roller 18K; developing blade 17K configured to thin a developer layer (toner layer) on developing roller 18K; and cleaning blade 19K configured to scrape off the developer remaining on the surface of photosensitive drum 13K after the primary transfer. Photosensitive drum 13K has a cylindrical shape and is rotated counterclockwise in the arrow direction by the rotational drive force transmitted from a drum motor to be described later. Photosensitive drum 13K includes a metal pipe (conductive base) and a photoconductive layer such as an organic photoconductor (OPC) formed around the metal pipe.

LED head 15K is disposed at a position opposite and close to the surface of photosensitive drum 13K. LED head 15K includes: a number of LED elements (light-emitting diode elements) arranged along a longitudinal direction of photosensitive drum 13K; an LED drive circuit configured to drive the LED elements; and an optical lens array configured to guide light emitted from the LED elements to the surface of photosensitive drum 13K.

Also, LED head 15K operates under the control of control circuit 60, and forms an electrostatic latent image on photosensitive drum 13K by irradiating the surface of photosensitive drum 13K with a pattern of light corresponding to an image expressed by print data. When a portion of the surface of photosensitive drum 13K where the electrostatic latent image is formed reaches developing roller 18K, the potential difference between the electrostatic latent image on photosensitive drum 13K and developing roller 18K moves the black developer to the electrostatic latent image, thereby forming a developer image (toner image) on photosensitive drum 13K. Thereafter, the developer image on photosensitive drum 13K is conveyed to a primary transfer position. At the primary transfer position, intermediate transfer belt 21 is nipped (sandwiched) between photosensitive drum 13K and primary transfer roller 25K. The developer image on photosensitive drum 13K is transferred onto the surface of intermediate transfer belt 21 by a transfer bias (voltage) applied to primary transfer roller 25K from positive bias supply 74K.

The other image formation units 10Y, 10M and 10C have approximately the same configuration as that of image formation unit 10K except for the kind of developer to be used. More specifically, image formation unit 10Y for the yellow image includes: toner cartridge 11Y configured to store a yellow developer; and development device 12Y. Development device 12Y includes: photosensitive drum 13Y that is an image carrier; charging roller 14Y as a charging unit configured to uniformly charge a surface of photosensitive drum 13Y; LED head 15Y configured to expose photosensitive drum 13Y; developing roller 18Y that is a developer carrier; feed roller 16Y configured to apply the developer supplied from toner cartridge 11Y to a surface of developing roller 18Y; developing blade 17Y; and cleaning blade 19Y configured to scrape off the developer remaining on the surface of photosensitive drum 13Y after the primary transfer.

Similarly, image formation unit 10M for the magenta image includes: toner cartridge 11M configured to store a magenta developer; and development device 12M. Development device 12M includes: photosensitive drum 13M that is an image carrier; charging roller 14M as a charging unit configured to uniformly charge a surface of photosensitive drum 13M; LED head 15M configured to expose photosensitive drum 13M; developing roller 18M that is a developer carrier; feed roller 16M configured to apply the developer supplied from toner cartridge 11M to a surface of developing roller 18M; developing blade 17M; and cleaning blade 19M configured to scrape off the developer remaining on the surface of photosensitive drum 13M after primary transfer.

Likewise, image formation unit 10C for the cyan image includes: toner cartridge 11C configured to store a cyan developer; and development device 12C. Development device 12C includes: photosensitive drum 13C that is an image carrier; charging roller 14C as a charging unit configured to uniformly charge a surface of photosensitive drum 13C; LED head 15C configured to expose photosensitive drum 13C; developing roller 18C that is a developer carrier; feed roller 16C configured to apply the developer supplied from toner cartridge 11C to a surface of developing roller 18C; developing blade 17C; and cleaning blade 19C configured to scrape off the developer remaining on the surface of photosensitive drum 13C after the primary transfer.

Development devices 12K, 12Y, 12M and 12C are arranged along a drive direction of intermediate transfer belt 21 (a direction from tension roller 22 to drive roller 23). The developer images of the four colors, which are formed by development devices 12K, 12Y, 12M and 12C, are sequentially transferred to the surface of intermediate transfer belt 21 and are superposed thereon. As a result, a color developer image can be formed on intermediate transfer belt 21. Intermediate transfer belt 21 can convey the color developer image to a secondary transfer position between secondary transfer roller 24 and backup roller 34 while carrying the color developer image on its surface.

Secondary transfer roller 24 and backup roller 34 are included in the secondary transfer unit configured to transfer the color developer image on intermediate transfer belt 21 onto print medium Pa. Secondary transfer roller 24 and backup roller are disposed so as to face each other and sandwich intermediate transfer belt 21 therebetween. Secondary transfer roller 24 may include a metal core material and an elastic layer (e.g., a foamed rubber layer) formed on an outer periphery of the core material, for example.

Belt cleaning unit 27 removes the developer remaining on intermediate transfer belt 21 after the secondary transfer. As illustrated in FIG. 2, belt cleaning unit 27 includes: cleaning blade 27B which comes into contact with the surface of intermediate transfer belt 21 at a constant pressure; and waste toner collection container 27C. Cleaning blade 27B can scrape the remaining developer off the surface of intermediate transfer belt 21.

Next, fixer 40 illustrated in FIG. 1 has a function to fix the developer image on print medium Pa conveyed from the secondary transfer unit onto print medium Pa. Fixer 40 includes circular tube-shaped fixing roller 41 rotating clockwise and circular tube-shaped pressure roller 42 rotating counterclockwise. Fixing roller 41 and pressure roller 42 are disposed so as to face each other. Inside fixing roller 41, heater (heat source) 43 such as a halogen lamp is disposed. Also, each of fixing roller 41 and pressure roller 42 has a surface layer made of an elastic material. Fixing roller 41 and pressure roller 42 can fix the developer image to print medium Pa by applying pressure and heat to print medium Pa nipped (sandwiched) between fixing roller 41 and pressure roller 42 and thereby melting the developer image.

Next, a description is given of control circuit 60 and high-voltage power supply device 70 in image formation apparatus 1.

Figure 3:
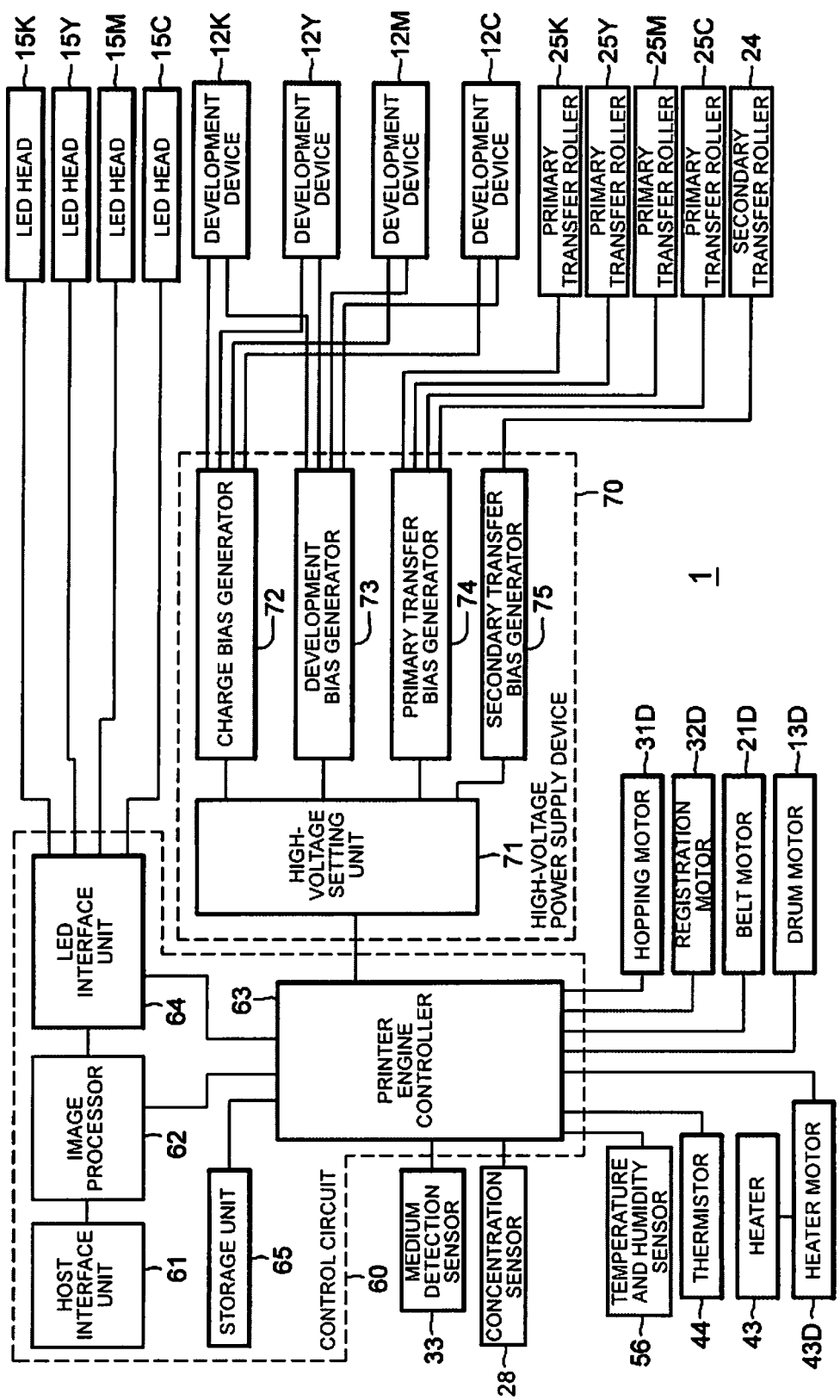
FIG. 3 is a block diagram illustrating a schematic configuration of a control circuit and a high-voltage power supply device according to Embodiment 1.

FIG. 3 is a block diagram illustrating a schematic configuration of control circuit 60 and high-voltage power supply device 70 according to Embodiment 1. As illustrated in FIG. 3, control circuit 60 includes host interface unit 61, image processor 62, printer engine controller 63, LED interface unit 64 and storage unit 65.

Host interface unit 61 has a communication interface function to control the communication between an unillustrated external device (host device) and image processor 62. For example, when the external device inputs print job data described in a PDL (Page Description Language) format or the like to image processor 62 through host interface unit 61, image processor 62 generates bit map data (image data) based on the inputted print job data, and outputs the bit map data to LED interface unit 64 and printer engine controller 63. LED interface unit 64 operates under the control of printer engine controller 63 and outputs drive signals of four channels (four systems) corresponding to black, yellow, magenta and cyan, respectively, based on the bit map data. LED heads 15K, 15Y, 15M and 15C emit light in patterns corresponding to the four-channel drive signals supplied respectively from LED interface unit 64, and thus can form electrostatic latent images on photosensitive drums 13K, 13Y, 13M and 13C.

As illustrated in FIG. 3, image formation apparatus 1 also includes: hopping motor 31D configured to generate a drive force to rotate hopping roller 31; registration motor 32D configured to generate a drive force to rotate registration rollers 32A and 32B; belt motor 21D configured to generate a drive force to rotate drive roller 23; and drum motor 13D configured to generate drive force to rotate photosensitive drums 13K, 13Y, 13M and 13C. Printer engine controller 63 can individually control the rotation speeds of hopping motor 31D, registration motor 32D, belt motor 21D and drum motor 13D.

Image formation apparatus 1 further includes, as illustrated in FIG. 3, concentration sensor 28, medium detection sensor 33, heater 43, thermistor 44 and temperature and humidity sensor 56. Concentration sensor 28 is disposed so as to face a transfer surface of intermediate transfer belt 21 as illustrated in FIG. 1. Concentration sensor 28 detects a reflection density (optical density detected based on a ratio of reflected light to incident light) of the developer on intermediate transfer belt 21 for each color, and supplies an electric signal indicating the detection result to printer engine controller 63. For example, concentration sensor 28 may include: a light-emitting diode configured to irradiate light toward the transfer surface of intermediate transfer belt 21; and a light-receiving element, such as a phototransistor and a photodiode, configured to receive light reflected therefrom. Prior to an image formation operation on print medium Pa, printer engine controller 63 controls image formation units 10K, 10Y, 10M and 10C to transfer the developer images of the four colors onto intermediate transfer belt 21, thereby enabling development bias adjustment for each color based on the reflection densities thereof.

Medium detection sensor 33 detects print medium Pa present on a conveyance path from medium storage cassette 30 to the secondary transfer position, and supplies an electric signal indicating the detection result to printer engine controller 63. Medium detection sensor 33 may be a contact sensor configured to detect the passage of print medium Pa by coming into contact with print medium Pa moving on the conveyance path, or may be a non-contact sensor configured to optically detect the passage of print medium Pa. Based on the result of the detection by medium detection sensor 33, printer engine controller 63 can adjust the conveyance speed of print medium Pa or control when to start the rotation operation of conveyance rollers 51A, 51B, 52A, 52B, 53A and 53B.

Heater 43 is disposed inside fixing roller 41 as illustrated in FIG. 1, and generates heat according to the power (bias voltage) supplied from heater motor 43D. Thermistor 44 is a sensor to detect the temperature of fixing roller 41, and is disposed inside fixer 40. Printer engine controller 63 can control the generated heat temperature of fixing roller 41 by adjusting the rotation speed of heater motor 43D based on the temperature detected by thermistor 44.

Temperature and humidity sensor 56 is a sensor to detect the temperature and humidity in an internal space of image formation apparatus 1. Printer engine controller 63 can control the operation of high-voltage power supply device 70 based on a result of the detection by temperature and humidity sensor 56 as described later.

Meanwhile, high-voltage power supply device 70 includes high-voltage setting unit 71, charge bias generator 72, development bias generator 73, primary transfer bias generator 74 and secondary transfer bias generator 75. Charge bias generator 72 is a power circuit to generate four-system charge biases (direct-current voltages) to be supplied to charge rollers 14K, 14Y, 14M and 14C in development devices 12K, 12Y, 12M and 12C. Meanwhile, development bias generator 73 is a power circuit to generate four-system development biases (direct-current voltages) to be supplied to developing rollers 18K, 18Y, 18M and 18C in development devices 12K, 12Y, 12M and 12C. Secondary transfer bias generator 75 is a power circuit to generate a transfer bias (direct-current voltage) to be supplied to secondary transfer roller 24.

Figure 4:
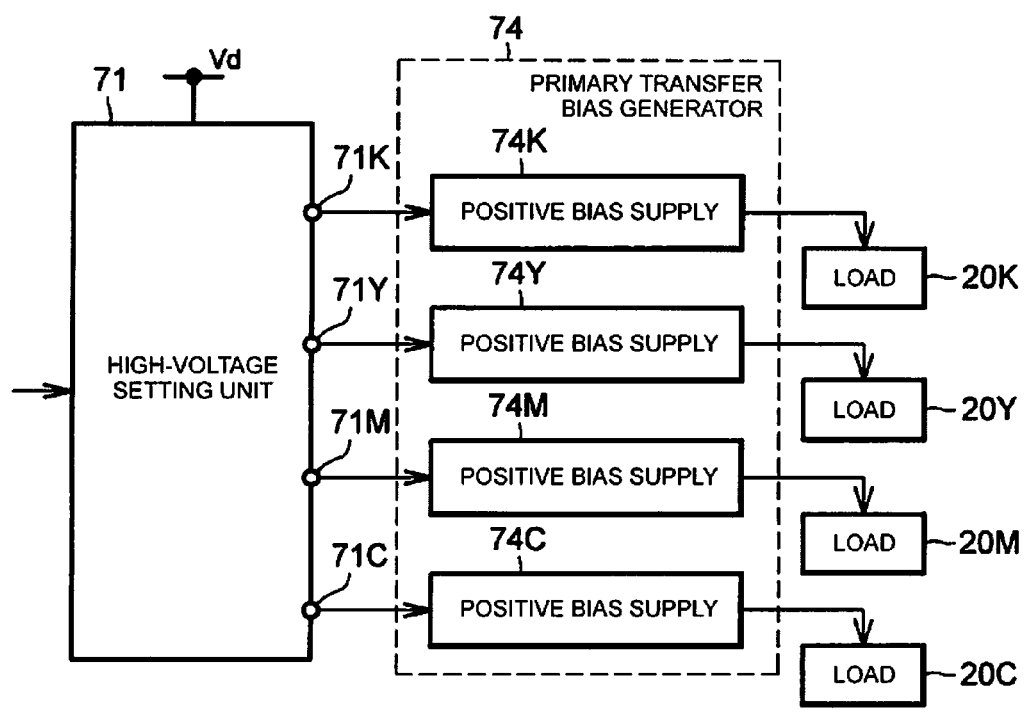
FIG. 4 is a block diagram illustrating a schematic configuration of a primary transfer bias generator according to Embodiment 1.

Primary transfer bias generator 74 is a power circuit to generate a transfer bias (direct-current voltage) to be supplied to each of primary transfer rollers 25K, 25Y, 25M and 25C. As illustrated in FIG. 4, primary transfer bias generator 74 includes positive bias supplies 74K, 74Y, 74M and 74C (FIG. 2). Positive bias supplies 74K, 74Y, 74M and 74C supply positive transfer biases to primary transfer rollers 25K, 25Y, 25M and 25C to transfer negatively-charged developer images onto print medium Pa. Loads 20K, 20Y, 20M and 20C illustrated in FIG. 4 include primary transfer rollers 25K, 25Y, 25M and 25C, respectively.

Printer engine controller 63 sets output voltage and indicator current values according to table values pre-stored in storage unit 65, and gives the result of the setting to high-voltage setting unit 71 as a control command. In response to the control command from printer engine controller 63, high-voltage setting unit 71 uses power-supply voltage Vd to supply a control voltage (indicator voltage) to each of charge bias generator 72, development bias generator 73, primary transfer bias generator 74 and secondary transfer bias generator 75. Each of charge bias generator 72, development bias generator 73, primary transfer bias generator 74 and secondary transfer bias generator 75 generates a bias voltage specified by the control command.

Note that each of printer engine controller 63 and high-voltage setting unit 71 described above may have a configuration including, for example, a non-volatile memory for storing a control program code, a processor such as a CPU (Central Processing Unit) to execute the program code, a working memory, and an input-output interface circuit. Also, printer engine controller 63 can execute control based on setting data stored in storage unit 65 that is an external memory.

Next, a configuration of primary transfer bias generator 74 is described. As illustrated in FIG. 4, positive bias supplies 74K, 74Y, 74M and 74C operate according to four-system analog voltages, i.e., indicator voltages outputted from DAC output ports 71K, 71Y, 71M and 71C of high-voltage setting unit 71. Storage unit 65 illustrated in FIG. 3 stores multiple table values preset according to a combination of temperature, humidity and print speed. Printer engine controller 63 acquires from storage unit 65 a table value corresponding to the detection result from temperature and humidity sensor 56 and the print speed. Then, printer engine controller 63 sets an indicator current value corresponding to a current to be supplied to each of loads 20K, 20Y, 20M and 20C, based on the table value, and gives the setting result as a control command to high-voltage setting unit 71. In response to the control command, high-voltage setting unit 71 generates a DAC set value (digital value) corresponding to the indicator current value for each of positive bias supplies 74K, 74Y, 74M and 74C, and also performs A/D conversion of the DAC set value, i.e., converts the DAC set value into an analog voltage, i.e., an indicator voltage.

Figure 5:
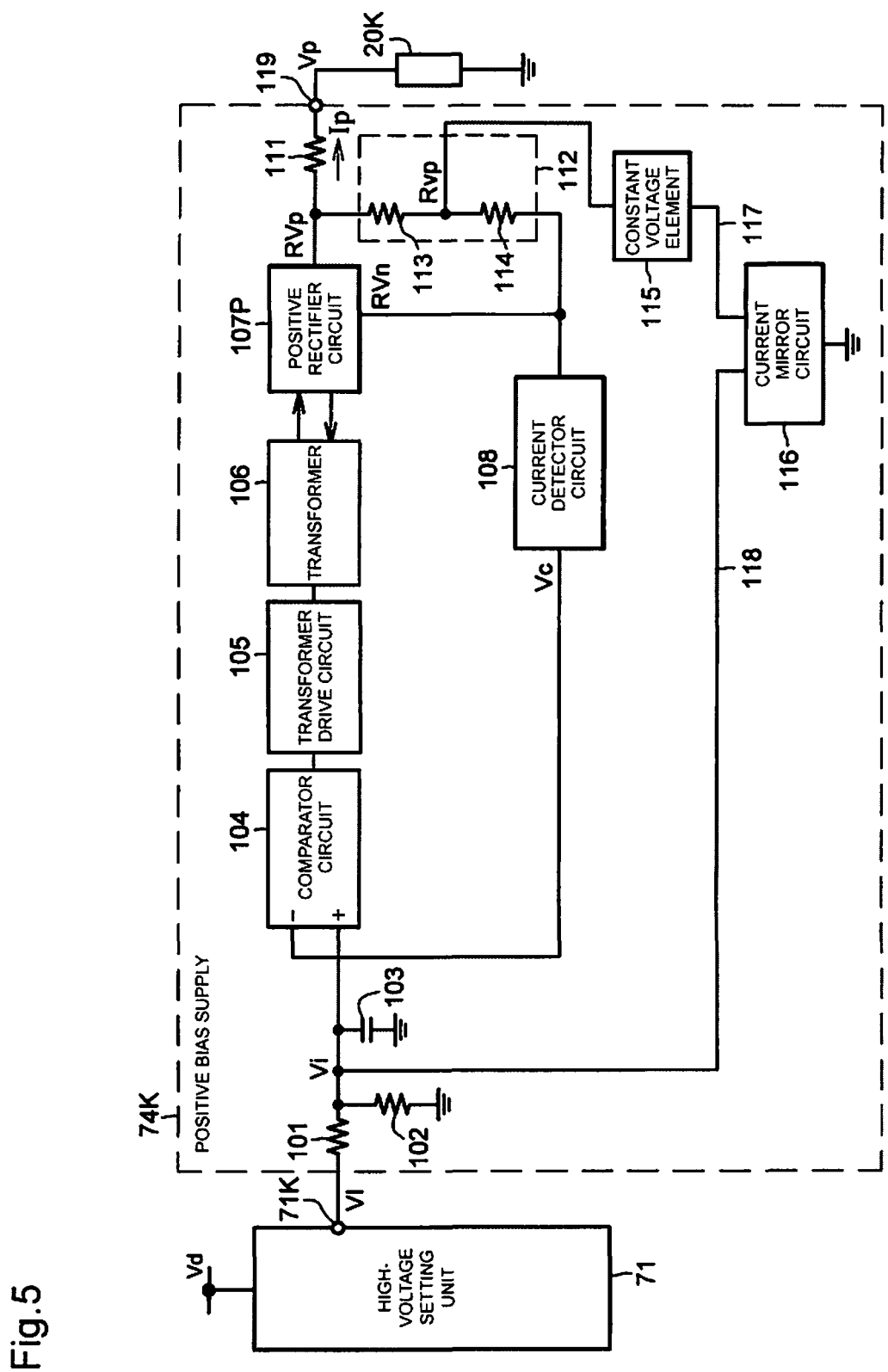
FIG. 5 is a diagram illustrating a schematic configuration of a positive bias supply according to Embodiment 1.

Since positive bias supplies 74K, 74Y, 74M and 74C all have the same configuration, only the configuration of positive bias supply 74K is described in detail below. FIG. 5 is a diagram illustrating a schematic configuration of positive bias supply 74K. Positive bias supply 74K generates a positive transfer bias according to indicator voltage VI inputted from DAC output port 71K of high-voltage setting unit 71. Positive bias supply 74K is a constant current-controlled power supply capable of supplying an approximately constant current Ip to load 20K even when the electrical characteristics of load 20K vary within a predetermined range. A value of indicator voltage VI corresponds to a value of a target current (indicator current) to flow through load 20K.

As illustrated in FIG. 5, positive bias supply 74K includes: resistors 101 and 102 configured to generate an indicator voltage (input voltage) Vi by lowering the inputted indicator voltage VI; capacitor 103 configured to remove an unnecessary voltage component such as noise; comparator circuit 104; transformer 106; transformer drive circuit 105 configured to drive transformer 106; positive rectifier circuit 107P configured to generate a positive rectified voltage RVp of a reference potential (ground potential) or more by rectifying the output from transformer 106; and power-supply output terminal 119 configured to supply load 20K with output voltage Vp and output current Ip generated based on rectified voltage RVp. Here, high-voltage resistor 111 is interposed between power-supply output terminal 119 and positive rectifier circuit 107P.

Transformer 106 may be an electromagnetic transformer having multiple coils (windings) that can be magnetically coupled to each other, or may be a piezoelectric transformer having a piezoelectric vibrator such as piezoelectric ceramics.

Positive bias supply 74K also includes current detector circuit 108 configured to generate comparison voltage Vc corresponding to output current Ip based on the output from positive rectifier circuit 107P. Positive rectifier circuit 107P generates the positive rectified voltage RVp. Current detector circuit 108 can generate comparison voltage Vc corresponding to output current Ip based on rectified voltages RVn and RVp. Comparator circuit 104 compares comparison voltage Vc to indicator voltage Vi, and controls the operation of transformer drive circuit 105 so as to reduce the difference (difference absolute value) between comparison voltage Vc and indicator voltage Vi. Thus, feedback control, i.e., constant current control, is executed so that output current Ip coincides with a current specified by indicator voltage Vi.

Positive bias supply 74K further includes: voltage-divider circuit 112 configured to generate a divided voltage Rvp (Rvp<RVp) by dividing the rectified voltage RVp; constant voltage element 115 to which divided voltage Rvp is applied as a reverse bias voltage; current mirror circuit 116 connected in series with constant voltage element 115 through current path 117; and current path 118 electrically connecting current mirror circuit 116 with an input terminal of comparator circuit 104. Voltage-divider circuit 112 includes voltage-dividing resistors (series-connected resistors) 113 and 114 connected between an output terminal of positive rectifier circuit 107P and an input terminal of current detector circuit 108. Divided voltage Rvp is generated at a connection point between voltage-dividing resistors 113 and 114. Current mirror circuit 116 is connected to two current paths 117 and 118, and can allow a current proportional to a current flowing through one current path 117 to flow through the other current path 118.

During the constant current control, when the value of output voltage Vp is below a predetermined upper limit THp, constant voltage element 115 is not conducted. On the other hand, when the value of output voltage Vp is increased to reach upper limit THp, constant voltage element 115 operates as a constant voltage source to clamp divided voltage Rvp, thereby limiting the increase in output voltage Vp. Also, in this event, constant voltage element 115 is conducted to allow a constant current to flow through current path 117 and current mirror circuit 116. Current mirror circuit 116 allows a current proportional to the current flowing through current path 117 to flow through current path 118, and thus allows a current to flow through resistor 101, thereby lowering indicator voltage Vi. Thus, positive bias supply 74K can protect load 20K from overvoltage during constant current control and also surely prevent any intermittent output of voltage to load 20K.

Figure 6:
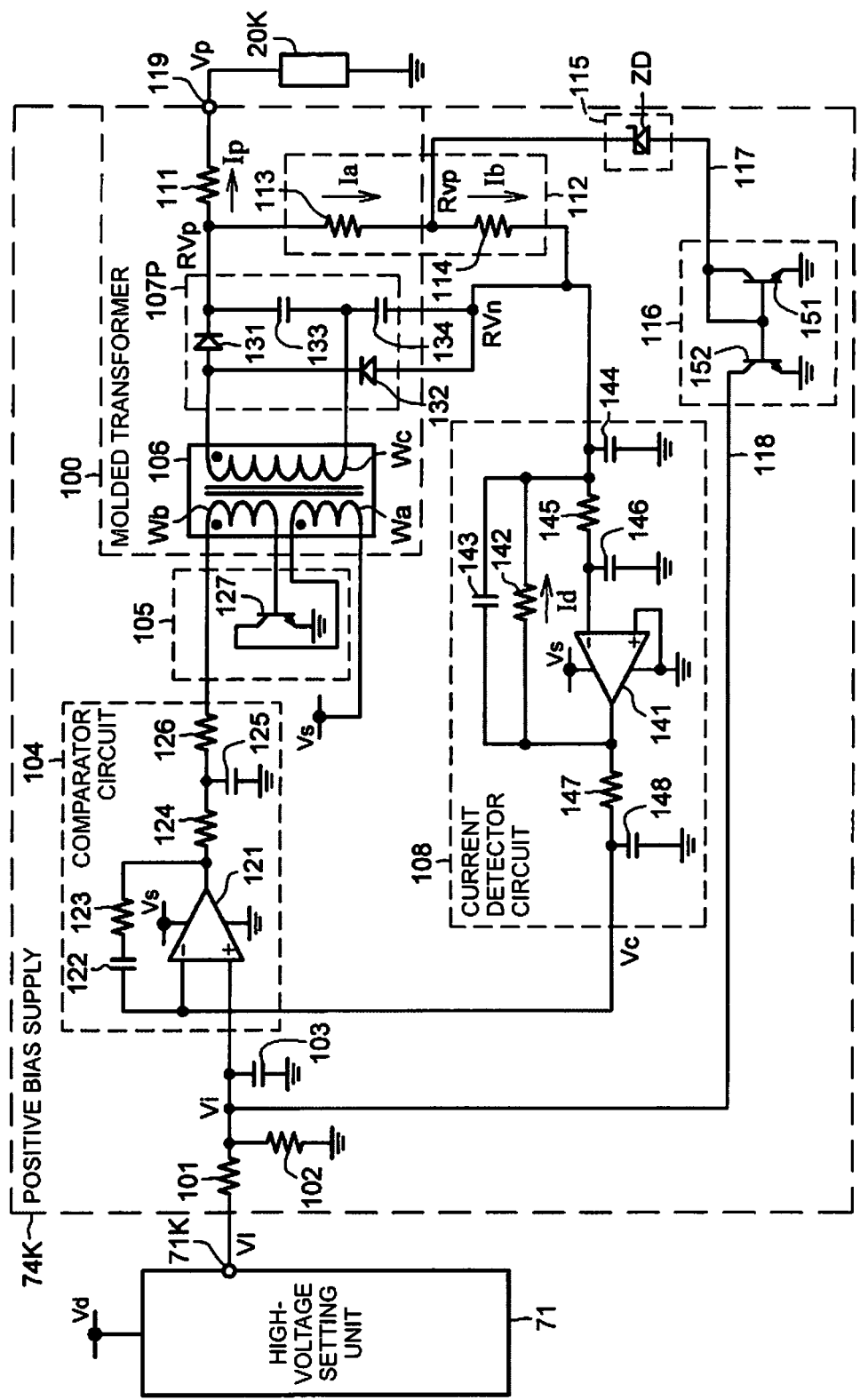
FIG. 6 is a diagram illustrating a circuit configuration example of the positive bias supply when an electromagnetic transformer is used.

Next, with reference to FIG. 6, a description is given of a more specific circuit configuration of positive bias supply 74K. FIG. 6 is a diagram illustrating a circuit configuration example of positive bias supply 74K when an electromagnetic transformer is used as transformer 106.

As illustrated in FIG. 6, comparator circuit 104 includes: operation amplifier 121 configured to operate using a positive supply voltage Vs (e.g., 24 volts) and a negative supply voltage (ground potential); and capacitor 122 and resistor 123, which are connected in parallel to operation amplifier 121, between an inverting input terminal (minus terminal) of operation amplifier 121 and an output terminal thereof. Here, capacitor 122 and resistor 123 are connected in series with each other. Also, indicator voltage Vi is inputted to a non-inverting input terminal (plus terminal) of operation amplifier 121. Operation amplifier 121 constitutes an integration circuit, which operates according to a time constant set by the capacitance of capacitor 122 and the electric resistance of resistor 123. Comparator circuit 104 further includes capacitor 125 and resistors 124 and 126 connected to the output terminal of operation amplifier 121.

Electromagnetic transformer 106 includes primary main winding Wa, primary auxiliary winding Wb and secondary winding Wc. Transformer drive circuit 105 includes npn-type bipolar transistor 127. A base of bipolar transistor 127 is connected to the output terminal of comparator circuit 104 through primary auxiliary winding Wb, a collector thereof is connected to one end of primary main winding Wa, and a ground potential is applied to an emitter thereof. Also, power-supply voltage Vs (e.g., 24 volts) is supplied to the other end of primary main winding Wa.

Positive rectifier circuit 107P includes: high-voltage half-wave rectifier diodes 131 and 132 connected to one end of secondary winding Wc in electromagnetic transformer 106; and high-voltage capacitors 133 and 134. Capacitor 133 is connected between a cathode of one half-wave rectifier diode 131 and the other end of secondary winding Wc, while capacitor 134 is connected between an anode of the other half-wave rectifier diode 132 and the other end of secondary winding Wc. Also, one half-wave rectifier diode 131 has an anode connected to one end of secondary winding Wc, and outputs a positive voltage by half-wave rectifying an alternating-current voltage inputted to the anode. Capacitor 133 generates the positive rectified voltage RVp by smoothing the positive voltage. The other half-wave rectifier diode 132 has a cathode connected to one end of secondary winding Wc, and outputs a negative voltage by half-wave rectifying an alternating-current voltage inputted to the cathode. Capacitor 134 generates the negative rectified voltage RVn by smoothing the negative voltage.

Here, electromagnetic transformer 106, positive rectifier circuit 107P, high-voltage resistor 111 and high-voltage voltage-dividing resistor 113 are sealed with a highly insulating material, such as an epoxy resin, to form molded transformer 100.

Current detector circuit 108 includes operation amplifier 141 configured to operate using a positive supply voltage Vs (e.g., 24 volts) and a negative supply voltage (ground potential). A reference potential (ground potential) is inputted to a non-inverting input terminal (plus terminal) of operation amplifier 141. Current detector circuit 108 also includes current detection resistor 142 and capacitor 143, which are connected in parallel to operation amplifier 141, between an inverting input terminal (minus terminal) of operation amplifier 141 and an output terminal thereof. Current detection resistor 142 and capacitor 143 are connected in parallel with each other. Furthermore, in current detector circuit 108, a pair of resistor 147 and capacitor 148 to form a filter for smoothing the output of operation amplifier 141 and a pair of resistor 145 and capacitors 146 and 144 to form a filter for smoothing the input to current detector circuit 108 are provided.

Constant voltage element 115 includes zener diode ZD. A cathode of zener diode ZD is connected to voltage-divider circuit 112, while an anode of zener diode ZD is connected to current mirror circuit 116 through current path 117. When a reverse bias equal to or greater than a zener voltage (e.g., 12 volts) is applied to both ends of zener diode ZD, zener diode ZD breaks down and operates as a constant voltage source (limiter circuit).

Current mirror circuit 116 includes a pair of npn-type bipolar transistors 151 and 152. The bases of bipolar transistors 151 and 152 are connected to each other, and a ground potential is applied to the emitters of bipolar transistors 151 and 152. A collector of one bipolar transistor 151 and the base thereof are short-circuited and are connected to the anode of zener diode ZD. A collector of the other bipolar transistor 152 is connected to a non-inverting input terminal (plus terminal) of operation amplifier 121 in comparator circuit 104 through current path 118. In current mirror circuit 116, a current approximately equal to the current flowing between the collector and emitter of one bipolar transistor 151 flows between the collector and emitter of the other bipolar transistor 152.

Next, a description is given below of the operations of positive bias supply 74K having the configuration illustrated in FIG. 6.

High-voltage setting unit 71 can generate indicator voltage VI within a range of 0.0 to 3.3 volts by referring to power-supply voltage Vd of 3.3 volts, for example. Indicator voltage VI is divided by resistors 101 and 102 to be indicator voltage Vi. Assuming that the electric resistance of resistor 101 is 100 K ($=100\times10^3$)Ω and the electric resistance of resistor 102 is 1 M ($=1\times10^6$)Ω, indicator voltage VI within the range of 0.0 to 3.3 volts can be lowered to indicator voltage Vi within a range of 0.0 to 3.0 volts.

The output voltage of comparator circuit 104 is approximately zero volt in an initial state. When nonzero indicator voltage VI is inputted to positive bias supply 74K, the output voltage of comparator circuit 104 is increased in response to the input, switching bipolar transistor 127 from an OFF state to an ON state (conduction state). As a result, a current flows through primary main winding Wa in electromagnetic transformer 106. Thus, electromagnetic transformer 106 starts oscillation (self-oscillation) by LC resonance to generate an alternating-current voltage in secondary winding Wc. Positive rectifier circuit 107P generates a positive rectified voltage RVp by half-wave rectifying and smoothing the alternating-current voltage.

In current detector circuit 108, the output terminal of operation amplifier 141 discharges a source current after half-wave rectifier diode 132 in positive rectifier circuit 107P draws the current. For this reason, when a protection circuit including constant voltage element 115 and current mirror circuit 116 is not in operation, detection current Id, in an approximately equal amount to actual current Ip flowing through load 20K, flows through current detection resistor 142. Since a ground potential is applied to the non-inverting input terminal (plus terminal) of operation amplifier 141 that is negatively fed back, operation amplifier 141 tries to maintain the voltage of the inverting input terminal (minus terminal) at the ground potential. Accordingly, the output voltage of operation amplifier 141 is increased with an increase in the amount of current flowing through current detection resistor 142. Therefore, operation amplifier 141 can output a voltage corresponding to detection current Id from its output terminal.

Assuming that the electric resistance of current detection resistor 142 in current detector circuit 108 is 47 KΩ, for example, then the indicator current value corresponding to the potential of 3.0 volts can be set to about 64µ amperes (=3.0 V/47 KΩ). In this case, printer engine controller 63 can set an indicator current value within a range of 0 to 64 a amperes, which is proportional to indicator voltage VI within the range of 0.0 to 3.3 volts. Also, high-voltage setting unit 71 can generate a $2^8$ bit DAC set value within a range of 0 hex to FF hex, which is proportional to the indicator current value within the range of 0 to 64µ amperes (here, the symbol "hex" attached to the end of the numerical value indicates that the numerical value is a value in hexadecimal notation).

Operation amplifier 121 in comparator circuit 104 compares comparison voltage Vc generated by current detector circuit 108 with indicator voltage Vi. When comparison voltage Vc is lower than indicator voltage Vi, operation amplifier 121 increases a collector current of bipolar transistor 127 by increasing the output voltage of operation amplifier 121. On the other hand, when comparison voltage Vc is higher than indicator voltage Vi, operation amplifier 121 reduces the collector current of bipolar transistor 127 by lowering the output voltage of operation amplifier 121. As described above, comparator circuit 104 controls a base current of bipolar transistor 127 such that comparison voltage Vc becomes equal to indicator voltage Vi. Thus, this good balance between comparison voltage Vc and indicator voltage Vi stabilizes the output of comparator circuit 104.

It is assumed that the electric resistance of resistor 101 is 100 KΩ, the electric resistance of resistor 102 is 1 MΩ, the electric resistance of voltage-dividing resistor 113 is 50 MΩ, the electric resistance of voltage-dividing resistor 114 is 110 KΩ, the zener voltage of zener diode ZD is 12.0 volts and the potential difference between the collector and emitter of bipolar transistor 151 in current mirror circuit 116 is 0.6 volt. In this case, positive bias supply 74K executes a constant current control to allow output current Ip specified by indicator voltage VI to flow through load 20K when divided voltage Rvp is less than 12.6 volts. When divided voltage Rvp reaches 12.6 volts, zener diode ZD breaks down and a cathode-side potential (rectified voltage RVp) of half-wave rectifier diode 131 is about 5740 volts as shown in the following equation.

12.6 V×(50 MΩ+110 KΩ)/110 KΩ=about 5740 V

Therefore, when rectified voltage RVp reaches about 5740 volts, a current starts to flow through zener diode ZD, and a current approximately equal to this current flows through resistor 101 and current path 118. Thus, indicator voltage Vi inputted to the non-inverting input terminal (plus terminal) of operation amplifier 121 is lowered.

When the cathode-side potential (rectified voltage RVp) of half-wave rectifier diode 131 is increased to 6000 volts, a potential difference between the two ends of voltage-dividing resistor 113 becomes 5987.4 volts (=6000 V−12.6 V). Thus, current Ia flowing through voltage-dividing resistor 113 becomes about 119.7µ amperes as shown in the following equation.

5987.4 V/50 MΩ=about 119.7 µA

Meanwhile, current Ib flowing through voltage-dividing resistor 114 becomes about 114.5µ amperes as shown in the following equation.

12.6 V/110 KΩ=about 114.5 µA

In this event, the current flowing through zener diode ZD becomes 5.2µ amperes as shown in the following equation.

119.7 µA−114.5 µA=5.2 µA

Thus, voltage Vi of the non-inverting input terminal (plus terminal) of operation amplifier 121 in comparator circuit 104 is lowered by about 0.52 volt as shown in the following equation.

5.2 µA×100 KΩ=0.52 V

With such a reduction in voltage Vi, the indicator current value can be considered to be substantially lowered by about 11.1µ amperes as shown in the following expression.

(64 µA/3.0 V)×0.52 V≈11.1 µA

Accordingly, in a no-load state (when the impedance of load 20K is infinite), the indicator current value set by printer engine controller 63 is 16.3 µA. When rectified voltage RVp is 6000 volts, the calculated $2^8$ bit DAC set value becomes 65 (=(255/64 µA)×16.3 µA) in decimal notation and 41 hex in hexadecimal notation.

Furthermore, assuming that the rectified voltage RVp is 7000 V, current Ia flowing through voltage-dividing resistor 113 becomes about 139.7µ amperes as shown in the following expression.

(7000 V−12.6 V)/50 MΩ≈139.7 µA

Since current Ib flowing through voltage-dividing resistor 114 becomes about 114.5µ amperes as described above, the current flowing through zener diode ZD becomes about 25.2µ amperes as shown in the following equation.

139.7 µA−114.5 µA=25.2 µA

Thus, voltage Vi of the non-inverting input terminal (plus terminal) of operation amplifier 121 in comparator circuit 104 is lowered by about 2.52 volts as shown in the following equation.

25.2 µA×100 KΩ=2.52 V

With such a reduction in voltage Vi, the indicator current value can be considered to be substantially lowered by about 53.7µ amperes as shown in the following expression.

(64 µA/3.0 V)×2.52 V≈53.7 µA

A difference (=10.3 µA) between the substantial reduction (=53.7 µA) in indicator current value and the upper limit (=64 µA) of the indicator current value is numerically smaller than the current (=about 25.2 µA) flowing through zener diode ZD in the no-load state. Since comparator circuit 104 operates so as not to bring about such a state, the condition that rectified voltage RVp becomes 7000 V does not exist. Note that a current actually starts to flow in zener diode ZD before the reverse bias applied to zener diode ZD reaches the zener voltage. Therefore, the above calculations are not strictly established.

FIGS. 7 to 10 are tables showing characteristic values obtained for the circuit of positive bias supply 74K illustrated in FIG. 6. FIG. 7 shows characteristic values in the no-load state (when the impedance of load 20K is infinite). FIG. 8 shows characteristic values when the electric resistance of load 20K (load resistance) is 50 MΩ. FIG. 9 shows circuit values when the load resistance is 100 MΩ. FIG. 10 shows characteristic values when the load resistance is 200 MΩ. The characteristic values shown in FIGS. 7 to 10 are obtained assuming that the electric resistance of primary transfer roller 25K is within a range of 10 M to 100 MΩ and the primary transfer current flowing through primary transfer roller 25K is within a range of 30 to 50µ amperes.

Figure 11:
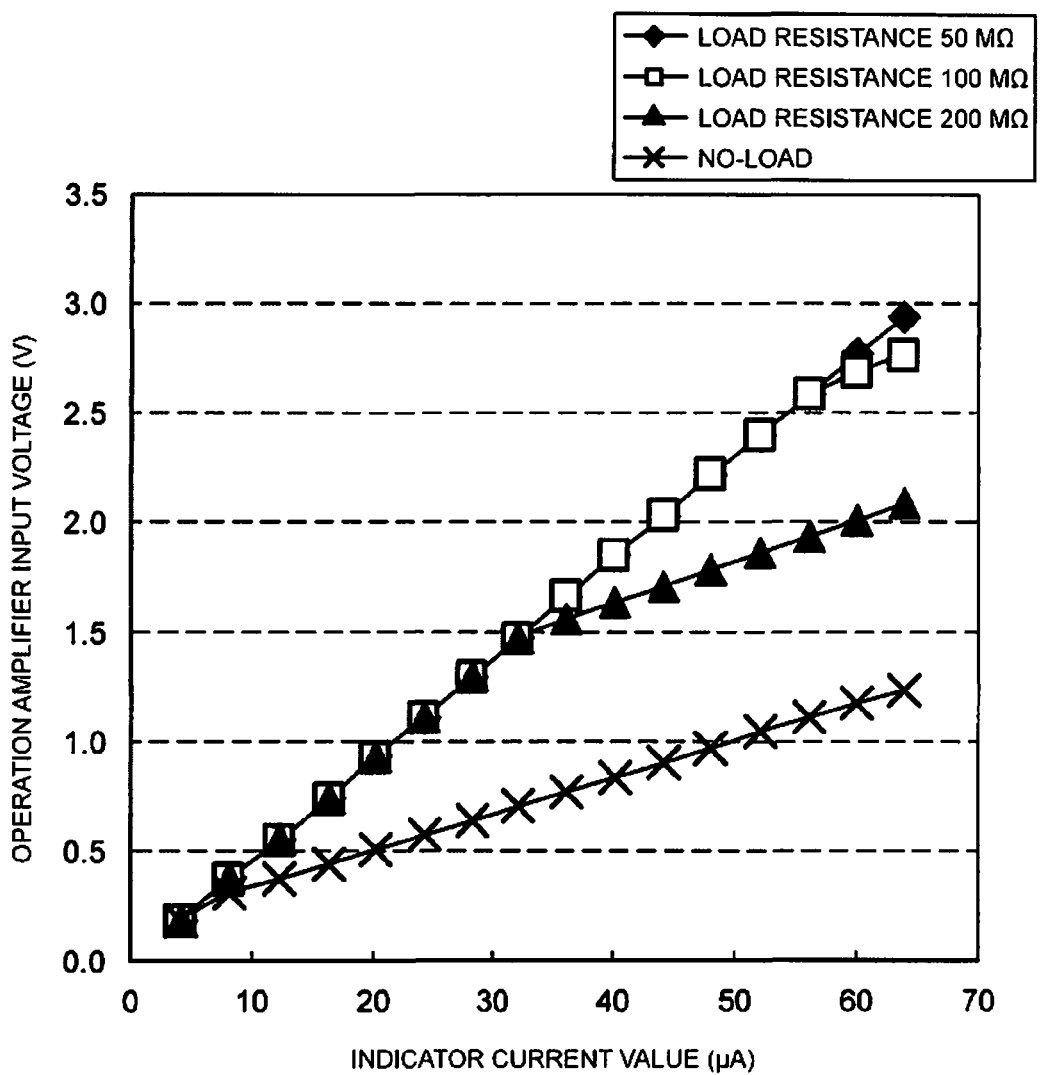
FIG. 11 is a graph created based on FIGS. 7 to 10, illustrating a relationship between an indicator current value and an input voltage Vi.
Figure 12:
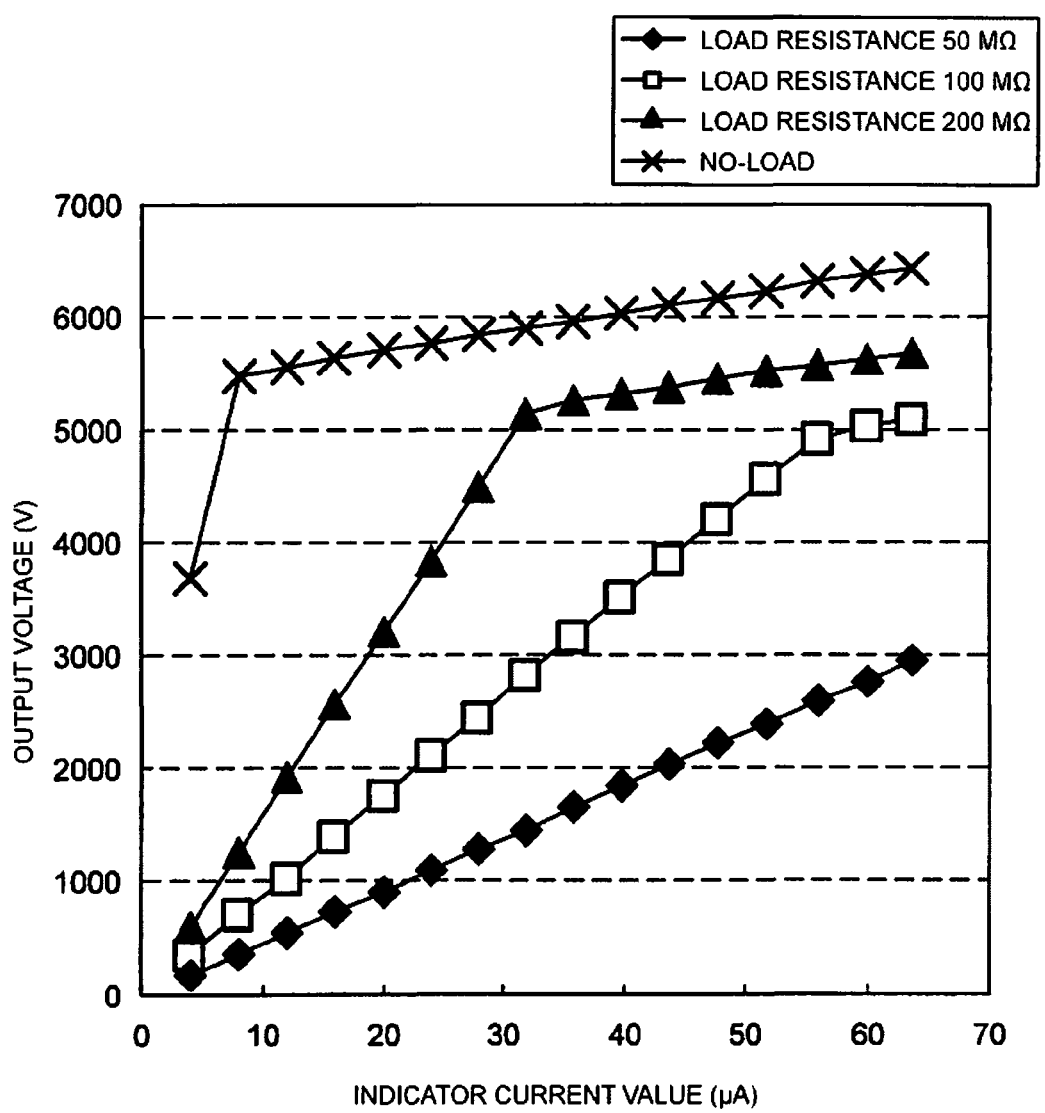
FIG. 12 is a graph created based on FIGS. 7 to 10, illustrating a relationship between the indicator current value and a transformer output voltage RVp.

FIG. 11 is a graph created based on FIGS. 7 to 10, illustrating a relationship between the indicator current value and input voltage Vi. FIG. 12 is a graph created based on FIGS. 7 to 10, illustrating a relationship between the indicator current value and transformer output voltage RVp. With reference to FIG. 12, it can be seen that the transformer output voltage RVp is suppressed so as not to be an overvoltage when the load resistance is 100 MΩ and 200 MΩ and when the load resistance is infinite (no-load state).

Note that a protection operation start voltage can be adjusted by changing the electric resistance of voltage-dividing resistor 114, for example. Also, a ratio of reduction in indicator voltage VI, i.e., a ratio of input voltage Vi to indicator voltage VI can be adjusted by changing the electric resistance of resistor 101, for example.

As described above, in positive bias supply 74K of Embodiment 1, when output voltage Vp reaches the upper threshold during the constant current control for load 20K, constant voltage element 115 operates as a constant voltage source and clamps divided voltage Rvp. Thus, an increase in output voltage Vp can be limited. At the same time, current mirror circuit 116 lowers input voltage Vi to comparator circuit 104 by allowing a current proportional to the current flowing through constant voltage element 115 to flow through current path 118. Thus, positive bias supply 74K can slowly perform an overvoltage protection operation during the constant current control. Moreover, even when load 20K continues to have an anomaly in its electrical characteristics, a high-voltage output waveform to load 20K can be stabilized without oscillation. The other positive bias supplies 74Y, 74M and 74C operate in the same manner. Thus, primary transfer bias generator 74 can surely prevent any intermittence of high-voltage output by the overvoltage protection operation or oscillation of the high-voltage output waveform.

Therefore, image formation apparatus 1 of this embodiment can stably perform image formation even when the impedance of primary transfer rollers 25K, 25Y, 25M and 25C is increased more than expected. Moreover, even in a low-temperature environment where the roller resistance is increased, the overvoltage protection operation goes underway at startup immediately after power activation. Thus, there is no stopping of a print operation.

Moreover, as illustrated in FIG. 5, the protection circuit including constant voltage element 115 and current mirror circuit 116 can operate independently of transformer drive circuit 105. In other words, the protection circuit of this embodiment is not dependent on transformer drive circuit 105. For this reason, the protection circuit is applicable regardless of the kind of transformer 106 and the oscillation method (self-oscillation and separately-excited oscillation). As transformer 106, a piezoelectric transformer, for example, can also be used instead of the electromagnetic transformer.

Furthermore, since the protection circuit is realized using hardware (analog circuit), load 20K can be surely protected from overvoltage and safety can be ensured even when operations of the processor in printer engine controller 63 or high-voltage setting unit 71 become unstable.

Embodiment 2

Next, Embodiment 2 according to the invention is described. Image formation apparatus 1 of Embodiment 1 described above includes primary transfer bias generator 74 configured to supply primary transfer rollers 25K, 25Y, 25M and 25C with a positive transfer bias to transfer negatively charged developer images onto print medium Pa. Differently, the image formation apparatus of Embodiment 2 includes a primary transfer bias generator configured to supply a negative transfer bias to transfer positively charged developer images onto print medium Pa.

Figure 13:
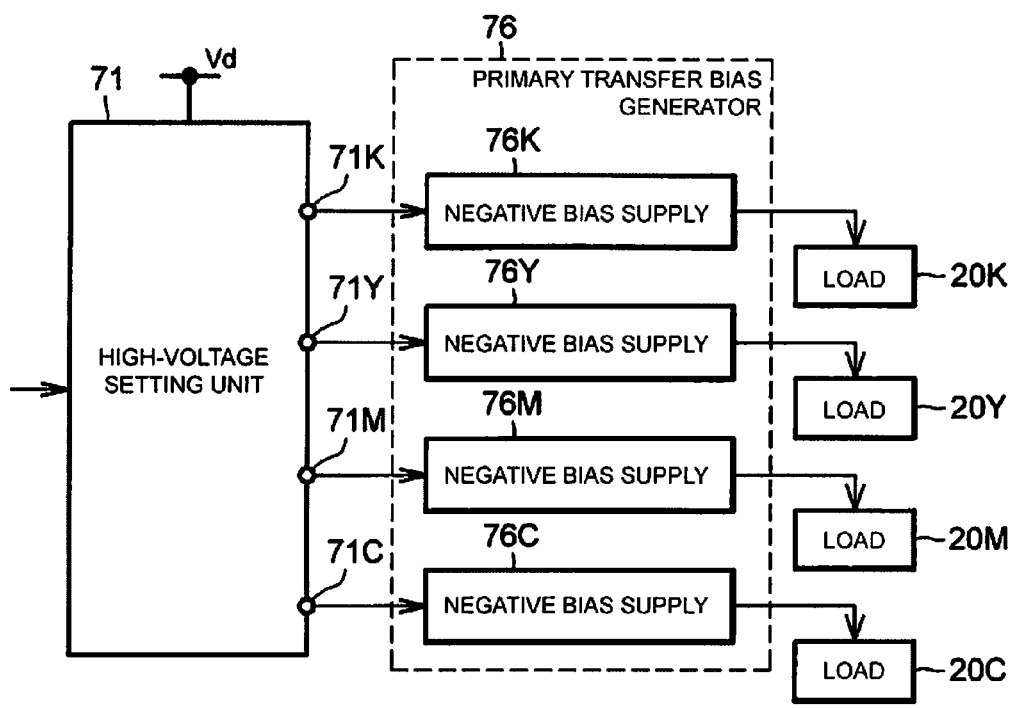
FIG. 13 is a block diagram illustrating a schematic configuration of a primary transfer bias generator of Embodiment 2 according to the invention.

FIG. 13 is a block diagram illustrating a schematic configuration of primary transfer bias generator 76 of Embodiment 2. Image formation apparatus of this embodiment has the same configuration as that of image formation apparatus 1 of Embodiment 1, except that the apparatus includes primary transfer bias generator 76 illustrated in FIG. 13 instead of primary transfer bias generator 74 of Embodiment 1 described above. However, in this embodiment, positively-charged developers are stored in toner cartridges 11K, 11Y, 11M and 11C, respectively.

As illustrated in FIG. 13, primary transfer bias generator 76 includes negative bias supplies 76K, 76Y, 76M and 76C. Negative bias supplies 76K, 76Y, 76M and 76C supply loads 20K, 20Y, 20M and 20C with a negative transfer bias to transfer positively-charged developer images onto print medium Pa. Negative bias supplies 76K, 76Y, 76M and 76C operate according to four-system analog voltages, i.e., indicator voltages outputted from DAC output ports 71K, 71Y, 71M and 71C of high-voltage setting unit 71. Since negative bias supplies 76K, 76Y, 76M and 76C all have the same configuration, only the configuration of negative bias supply 76K is described in detail below.

Figure 14:
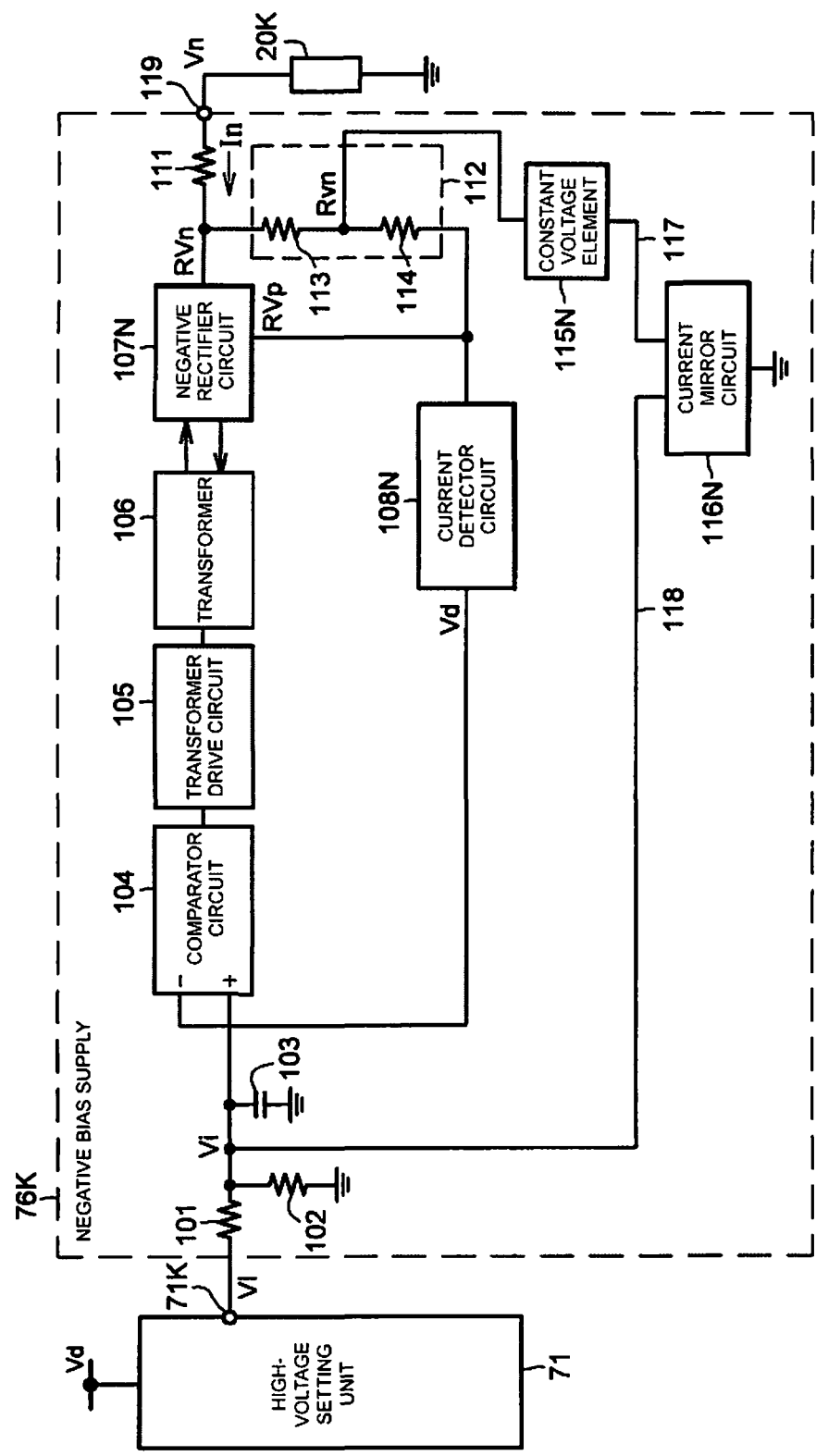
FIG. 14 is a diagram illustrating a schematic configuration of a negative bias supply according to Embodiment 2.

FIG. 14 is a diagram illustrating a schematic configuration of negative bias supply 76K. Negative bias supply 76K generates a negative transfer bias according to indicator voltage VI inputted from DAC output port 71K of high-voltage setting unit 71. Negative bias supply 76K is a constant current-controlled power supply capable of supplying an approximately constant current In to load 20K even when electrical characteristics of load 20K vary within a predetermined range. A value of indicator voltage VI corresponds to a value of a target current (indicator current) to flow through load 20K.

As illustrated in FIG. 14, negative bias supply 76K includes resistors 101 and 102, capacitor 103, comparator circuit 104, transformer drive circuit 105, transformer 106, voltage-divider circuit 112 and high-voltage resistor 111, as in the case of positive bias supply 74K of Embodiment 1. Negative bias supply 76K of this embodiment further includes: negative rectifier circuit 107N configured to generate negative rectified voltage RVn of a reference potential (ground potential) or less by rectifying the output from transformer 106; and power-supply output terminal 119 configured to supply load 20K with output voltage Vn and output current In generated based on negative rectified voltage RVn.

Negative bias supply 76K also includes current detector circuit 108N configured to generate comparison voltage Vd corresponding to output current In based on the output from negative rectifier circuit 107N. Negative rectifier circuit 107N also generates positive rectified voltage RVp, which is opposite to negative rectified voltage RVn. Negative rectifier circuit 107N can generate comparison voltage Vd corresponding to output current In based on rectified voltages RVn and RVp. Comparator circuit 104 compares comparison voltage Vd to indicator voltage Vi, and controls the operation of transformer drive circuit 105 so as to reduce a difference (difference absolute value) between comparison voltage Vd and indicator voltage Vi. Thus, feedback control, i.e., a constant current control, is executed so that output current In coincides with a current specified by indicator voltage Vi.

Negative bias supply 76K further includes: voltage-divider circuit 112 configured to generate divided voltage Rvp by dividing rectified voltage RVn; constant voltage element 115N to which divided voltage Rvn is applied as a reverse bias voltage; current mirror circuit 116N connected in series with constant voltage element 115N through current path 117; and current path 118 electrically connecting current mirror circuit 116N with an input terminal of comparator circuit 104. Divided voltage Rvn is generated at a connection point between voltage-dividing resistors 113 and 114. Current mirror circuit 116N is connected to two current paths 117 and 118, and can allow a current proportional to a current flowing through one current path 117 to flow through the other current path 118.

During the constant current control, when the value of output voltage Vn is larger than a predetermined lower limit THn, constant voltage element 115N is not conducted. On the other hand, when the value of output voltage Vn is lowered to reach lower limit THn, constant voltage element 115N operates as a constant voltage source to clamp divided voltage Rvn, thereby limiting the reduction in output voltage Vn. Also, in this event, constant voltage element 115N is conducted to allow a constant current to flow through current path 117 and current mirror circuit 116N. Current mirror circuit 116N allows a current proportional to the current flowing through current path 117 to flow through current path 118, and thus allows a current to flow through resistor 101, thereby lowering indicator voltage Vi. Thus, negative bias supply 76K can protect load 20K from overvoltage during the constant current control and also surely prevent any intermittent output of voltage to load 20K.

Figure 15:
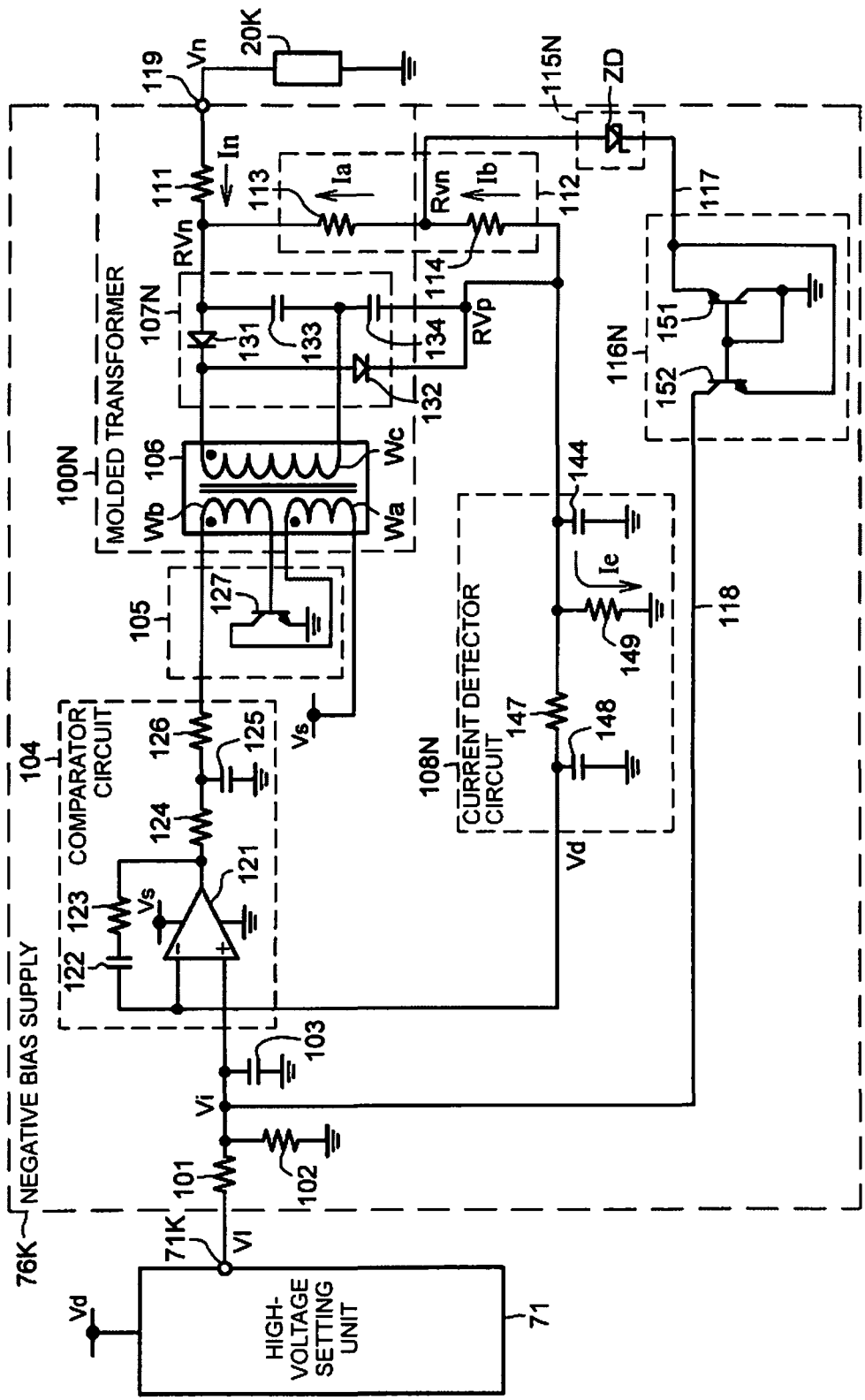
FIG. 15 is a diagram illustrating a circuit configuration example of the negative bias supply when an electromagnetic transformer is used.

Next, with reference to FIG. 15, a description is given of a more specific circuit configuration of negative bias supply 76K. FIG. 15 is a diagram illustrating a circuit configuration example of negative bias supply 76K when an electromagnetic transformer is used as transformer 106.

The circuit configurations of comparator circuit 104, transformer drive circuit 105 and transformer (electromagnetic transformer) 106 illustrated in FIG. 15 are the same as those of comparator circuit 104, transformer drive circuit 105 and transformer 106 illustrated in FIG. 6.

Negative rectifier circuit 107N includes: high-voltage half-wave rectifier diodes 131 and 132 connected to one end of secondary winding Wc in electromagnetic transformer 106; and high-voltage capacitors 133 and 134. Capacitor 133 is connected between an anode of one half-wave rectifier diode 131 and the other end of secondary winding Wc, while capacitor 134 is connected between a cathode of the other half-wave rectifier diode 132 and the other end of secondary winding Wc. Also, one half-wave rectifier diode 131 has a cathode connected to one end of secondary winding Wc, and outputs a negative voltage by half-wave rectifying an alternating-current voltage inputted to the cathode. Capacitor 133 generates negative rectified voltage RVn by smoothing the negative voltage. The other half-wave rectifier diode 132 has an anode connected to one end of secondary winding Wc, and outputs a positive voltage by half-wave rectifying an alternating-current voltage inputted to the anode. Capacitor 134 generates positive rectified voltage RVp by smoothing the positive voltage.

Here, electromagnetic transformer 106, negative rectifier circuit 107N, high-voltage resistor 111 and high-voltage voltage-dividing resistor 113 are sealed with a highly insulating material, such as an epoxy resin, to form molded transformer 100N.

Current detector circuit 108 includes capacitor 144, current detection resistor 149 and a pair of resistor 147 and capacitor 148 to form a smoothing filter. One end of current detection resistor 149 is connected to voltage-divider circuit 112 and negative rectifier circuit 107N, and a ground potential is applied to the other end of current detection resistor 149.

Constant voltage element 115N includes zener diode ZD. An anode of zener diode ZD is connected to voltage-divider circuit 112, while a cathode of zener diode ZD is connected to current mirror circuit 116N through current path 117. When a reverse bias equal to or greater than a zener voltage (e.g., 12 volts) is applied to both ends of zener diode ZD, zener diode ZD breaks down and operates as a constant voltage source (limiter circuit).

Current mirror circuit 116N includes a pair of npn-type bipolar transistors 151 and 152. The bases of bipolar transistors 151 and 152 are connected to each other, and a ground potential is applied thereto. In one bipolar transistor 151, the ground potential is applied to a collector, and an emitter is connected to the cathode of zener diode ZD. An emitter of the other bipolar transistor 152 is also connected to the cathode of zener diode ZD. Also, a collector of bipolar transistor 152 is connected to a non-inverting input terminal (plus terminal) of operation amplifier 121 in comparator circuit 104 through current path 118. In current mirror circuit 116N, the sum of a current flowing between the collector and emitter of one bipolar transistor 151 and a current flowing between the collector and emitter of the other bipolar transistor 152 becomes approximately equal to a current flowing through zener diode ZD.

Next, a description is given below of the operations of negative bias supply 76K having the configuration illustrated in FIG. 15.

High-voltage setting unit 71 can generate indicator voltage VI within a range of 0.0 to 3.3 volts by referring to power-supply voltage Vd of 3.3 volts, for example, as in the case of Embodiment 1. Indicator voltage VI is divided by resistors 101 and 102 to be indicator voltage VI. Assuming that the electric resistance of current detection resistor 149 is 47 KΩ, for example, the electric resistance of resistor 101 can be set to 200 KΩ.

The output voltage of comparator circuit 104 is approximately zero volt in an initial state. When nonzero indicator voltage VI is inputted to negative bias supply 76K, the output voltage of comparator circuit 104 is increased in response to the input, switching bipolar transistor 127 from an OFF state to an ON state (conduction state). As a result, a current flows through primary main winding Wa in electromagnetic transformer 106. Thus, electromagnetic transformer 106 starts oscillation (self-oscillation) by LC resonance to generate an alternating-current voltage in secondary winding Wc. Negative rectifier circuit 107N generates negative rectified voltage RVn and positive rectified voltage RVp by half-wave rectifying and smoothing the alternating-current voltage.

When a protection circuit including constant voltage element 115N and current mirror circuit 116N is not in operation, detection current Ie, in an approximately equal amount to actual current In flowing through load 20K, flows through current detection resistor 149. Accordingly, a potential difference between both ends of current detection resistor 149 is increased with an increase in the amount of current flowing through current detection resistor 149. Therefore, current detector circuit 108N can output comparison voltage Vd corresponding to detection current Ie.

Operation amplifier 121 in comparator circuit 104 compares comparison voltage Vd generated by current detector circuit 108N with indicator voltage Vi. When comparison voltage Vd is lower than indicator voltage Vi, operation amplifier 121 increases the collector current of bipolar transistor 127 by increasing the output voltage of operation amplifier 121. On the other hand, when comparison voltage Vd is higher than indicator voltage Vi, operation amplifier 121 reduces the collector current of bipolar transistor 127 by lowering the output voltage of operation amplifier 121. As described above, comparator circuit 104 controls the base current of bipolar transistor 127 such that comparison voltage Vd becomes equal to indicator voltage Vi. Thus, a good balance between comparison voltage Vd and indicator voltage Vi stabilizes the output of comparator circuit 104.

As described above, in negative bias supply 76K of Embodiment 2, when output voltage Vn reaches the lower limit during the constant current control for load 20K, constant voltage element 115N operates as a constant voltage source and clamps divided voltage Rvn. Thus, a reduction in output voltage Vn can be limited. At the same time, current mirror circuit 116N lowers input voltage Vi to comparator circuit 104 by allowing a current proportional to the current flowing through constant voltage element 115N to flow through current path 118. Thus, negative bias supply 76K can slowly perform an overvoltage protection operation during the constant current control, as in the case of positive bias supply 74K of Embodiment 1. Moreover, even when load 20K continues to have an anomaly in its electrical characteristics, a high-voltage output waveform to load 20K can be stabilized without oscillation. The other negative bias supplies 76Y, 76M and 76C operate in the same manner. Thus, primary transfer bias generator 76 can surely prevent any intermittence of high-voltage output by the overvoltage protection operation or oscillation of the high-voltage output waveform.

Therefore, image formation apparatus of this embodiment can stably perform image formation even when the impedance of primary transfer rollers 25K, 25Y, 25M and 25C is increased more than expected. Moreover, even in a low-temperature environment where the roller resistance is increased, the overvoltage protection operation goes underway at startup immediately after power activation. Thus, there is no stopping of a print operation.

Note that the electric resistance of voltage-dividing resistor 113 can be set to 50 MΩ, for example. The protection operation can be adjusted by adjusting the electric resistance of voltage-dividing resistor 113 or adjusting the electric resistance of resistors 101 and 102.

Embodiment 3

Figure 16:
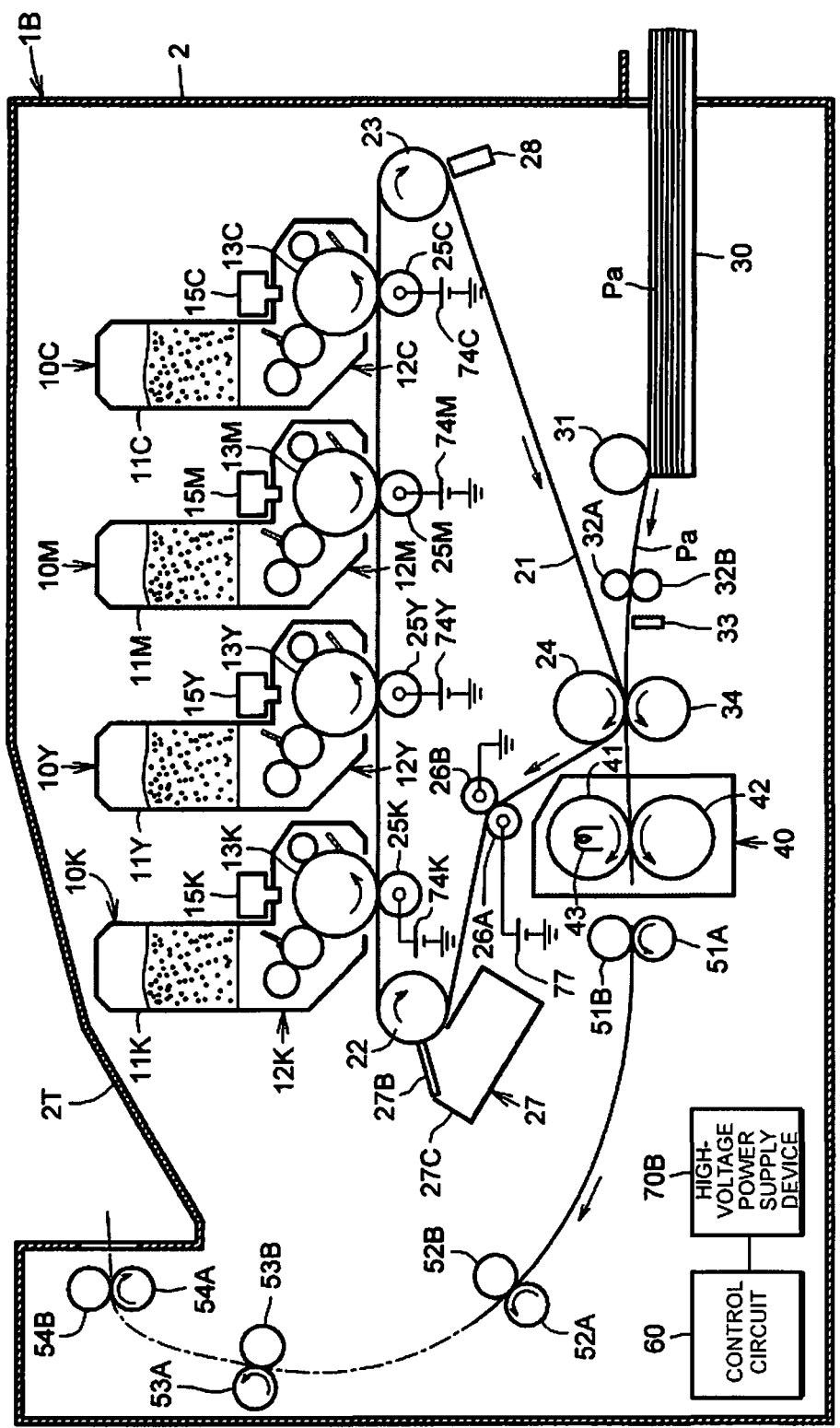
FIG. 16 is a diagram schematically illustrating the main configuration of an image formation apparatus of Embodiment 3 according to the invention.

Next, Embodiment 3 according to the invention is described. FIG. 16 is a diagram schematically illustrating the main configuration of image formation apparatus 1B of Embodiment 3.

Image formation apparatus 1B has the same configuration as that of image formation apparatus 1 of Embodiment 1, except that the apparatus includes a pair of bend roller 26A and backup roller 26B to sandwich and bend intermediate transfer belt 21. Embodiment 3 also includes high-voltage power supply device 70B instead of high-voltage power supply device 70 of Embodiment 1. Therefore, as to constituent elements denoted by the same reference numerals as those of the constituent elements illustrated in FIG. 1, detailed description thereof is omitted.

As illustrated in FIG. 16, image formation apparatus 1B includes bipolar bias generator 77 configured to supply bend roller 26A with a bias voltage. For convenience of illustration, bipolar bias generator 77 and high-voltage power supply device 70B are separately illustrated in FIG. 16. However, as described later, bipolar bias generator 77 is a part of the constituent elements of high-voltage power supply device 70B.

In image formation apparatus 1B of this embodiment, bend roller 26A and backup roller 26B bend intermediate transfer belt 21, and fixer 40 is disposed in a space generated by the bending of intermediate transfer belt 21. Thus, compared with image formation apparatus 1 of Embodiment 1, the distance between fixer 40 and a nip section between secondary transfer roller 24 and backup roller 34 is short. This enables an image formation on print medium Pa that is short in a medium conveyance direction.

Each of bend roller 26A and backup roller 26B includes a shaft member made of a metal core material and an elastic layer formed on an outer periphery of the shaft member. A ground potential is applied to the shaft member of backup roller 26B, and a bias voltage is supplied to the shaft member of bend roller 26A from bipolar bias generator 77.

Bend roller 26A is disposed in a region between cleaning blade 27B and the nip section between secondary transfer roller 24 and backup roller 34, and comes into contact with the surface of intermediate transfer belt 21. Thus, bend roller 26A does not come into contact with a developer image to be secondarily transferred on intermediate transfer belt 21, but comes into contact with a developer (including a patch image developer for concentration detection) remaining on intermediate transfer belt 21 without being secondarily transferred. Bipolar bias generator 77 supplies bend roller 26A with a positive or negative bias voltage to prevent adherence and deposition of the remaining developer on the surface of bend roller 26A.

For example, when a patch image for concentration detection, which is made of a negatively charged developer, is primarily transferred onto intermediate transfer belt 21, the patch image is recovered by belt cleaning unit 27 without being secondarily transferred. Bipolar bias generator 77 applies a negative bias voltage to bend roller 26A to prevent the developer of the patch image from adhering to bend roller 26A. Also in case of a jam (a state where print medium Pa is jammed in the conveyance path, for example), the developer image on intermediate transfer belt 21 is recovered by belt cleaning unit 27 without being secondarily transferred. Thus, bipolar bias generator 77 applies a negative bias voltage to bend roller 26A.

When there is no jam during a print operation and no patch image is primarily transferred, bipolar bias generator 77 alternately applies a positive bias and a negative bias to bend roller 26A at each rotation of bend roller 26A to return the developer adhering to bend roller 26A back onto intermediate transfer belt 21. In this event, the negative bias application moves the negatively charged developer to intermediate transfer belt 21, leaving a positively charged developer on bend roller 26A.

Bipolar bias generator 77 is a constant current-controlled power supply capable of supplying an approximately constant current to bend roller 26A. Bipolar bias generator 77 can execute constant current control so as to supply a current of −40μ amperes during a negative bias application and to supply a current of +20μ amperes during a positive bias application.

Figure 17:
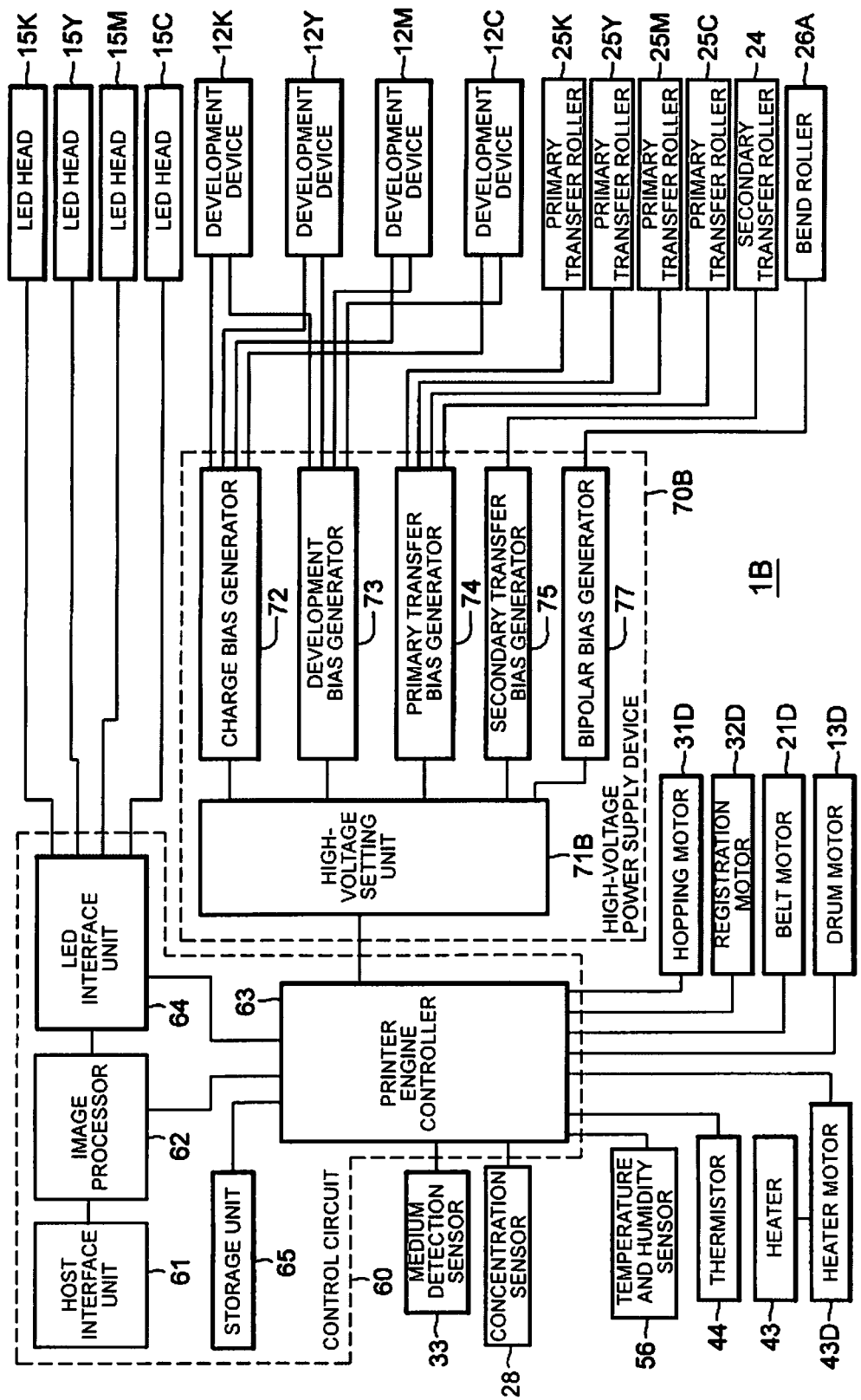
FIG. 17 is a block diagram illustrating a schematic configuration of a control circuit and a high-voltage power supply device according to Embodiment 3.

FIG. 17 is a block diagram illustrating a schematic configuration of control circuit 60 and high-voltage power supply device 70B according to Embodiment 3. The configuration of control circuit 60 illustrated in FIG. 17 is the same as the configuration (FIG. 3) of control circuit 60 in Embodiment 1.

As illustrated in FIG. 17, high-voltage power supply device 70B includes high-voltage setting unit 71B, charge bias generator 72, development bias generator 73, primary transfer bias generator 74, secondary transfer bias generator 75 and bipolar bias generator 77. Configurations of charge bias generator 72, development bias generator 73, primary transfer bias generator 74 and secondary transfer bias generator 75 illustrated in FIG. 17 are the same as the configurations (FIG. 3) of charge bias generator 72, development bias generator 73, primary transfer bias generator 74 and secondary transfer bias generator 75 in Embodiment 1, respectively.

Printer engine controller 63 sets indicator current values for positive bias supplies 74K, 74Y, 74M and 74C in primary transfer bias generator 74 according to table values pre-stored in storage unit 65, and gives the result of the setting as a control command to high-voltage setting unit 71B.

In response to the control command, high-voltage setting unit 71B generates a DAC set value (digital value) corresponding to the indicator current value for each of positive bias supplies 74K, 74Y, 74M and 74C and bipolar bias generator 77, and also performs A/D conversion of the DAC set value, i.e., converts the DAC set value into an analog voltage, i.e., an indicator voltage.

Figure 18:
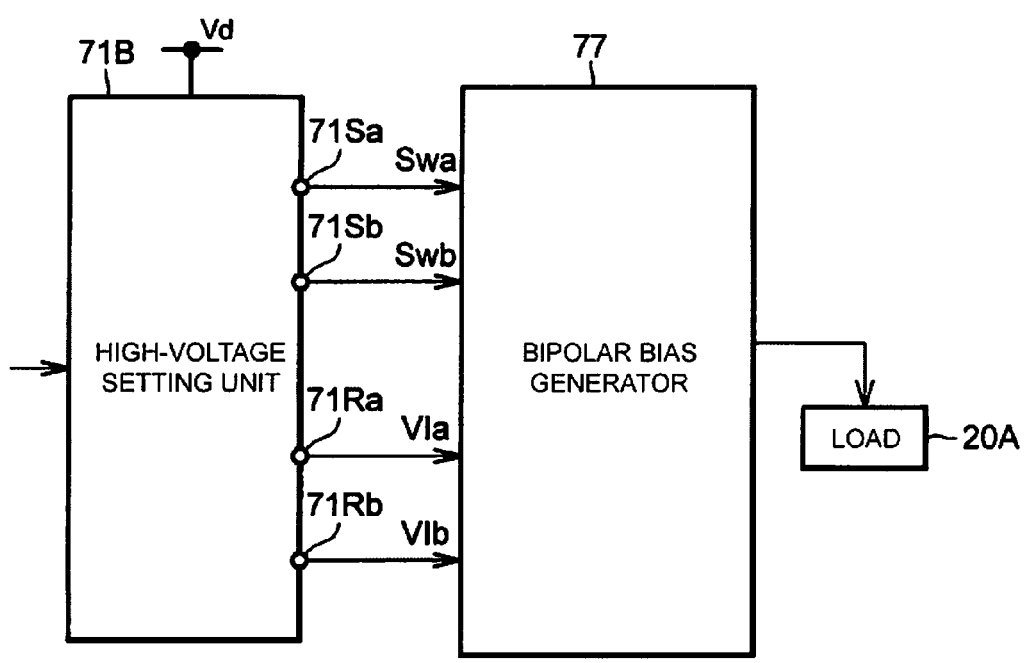
FIG. 18 is a block diagram illustrating a schematic configuration of a bipolar bias generator according to Embodiment 3.

As illustrated in FIG. 18, high-voltage setting unit 71B includes: control output ports 71Sa and 71Sb configured to output bias output control signals Swa and Swb, respectively; a DAC output port 71Ra configured to output indicator voltage VIa corresponding to an indicator current value for negative bias application; and a DAC output port 71Rb configured to output indicator voltage VIb corresponding to an indicator current value for positive bias application. High-voltage setting unit 71B generates bias output control signals SWa and SWb having any one of signal levels, an L level (low level) indicating a logical value "0" and an H level (high level) indicating a logical value "1". When the signal level of one of bias output control signals SWa and SWb is the H level, the signal level of the other signal becomes the L level. Therefore, bias output control signals SWa and SWb do not have the same signal level at the same time.

When the signal level of one bias output control signal Swa is the H level, bipolar bias generator 77 generates a negative bias corresponding to indicator voltage VIa and supplies the negative bias to load 20A including bend roller 26A. Meanwhile, when the signal level of the other bias output control signal Swb is the H level, bipolar bias generator 77 generates a positive bias corresponding to indicator voltage VIb and supplies the positive bias to load 20A.

Figure 19:
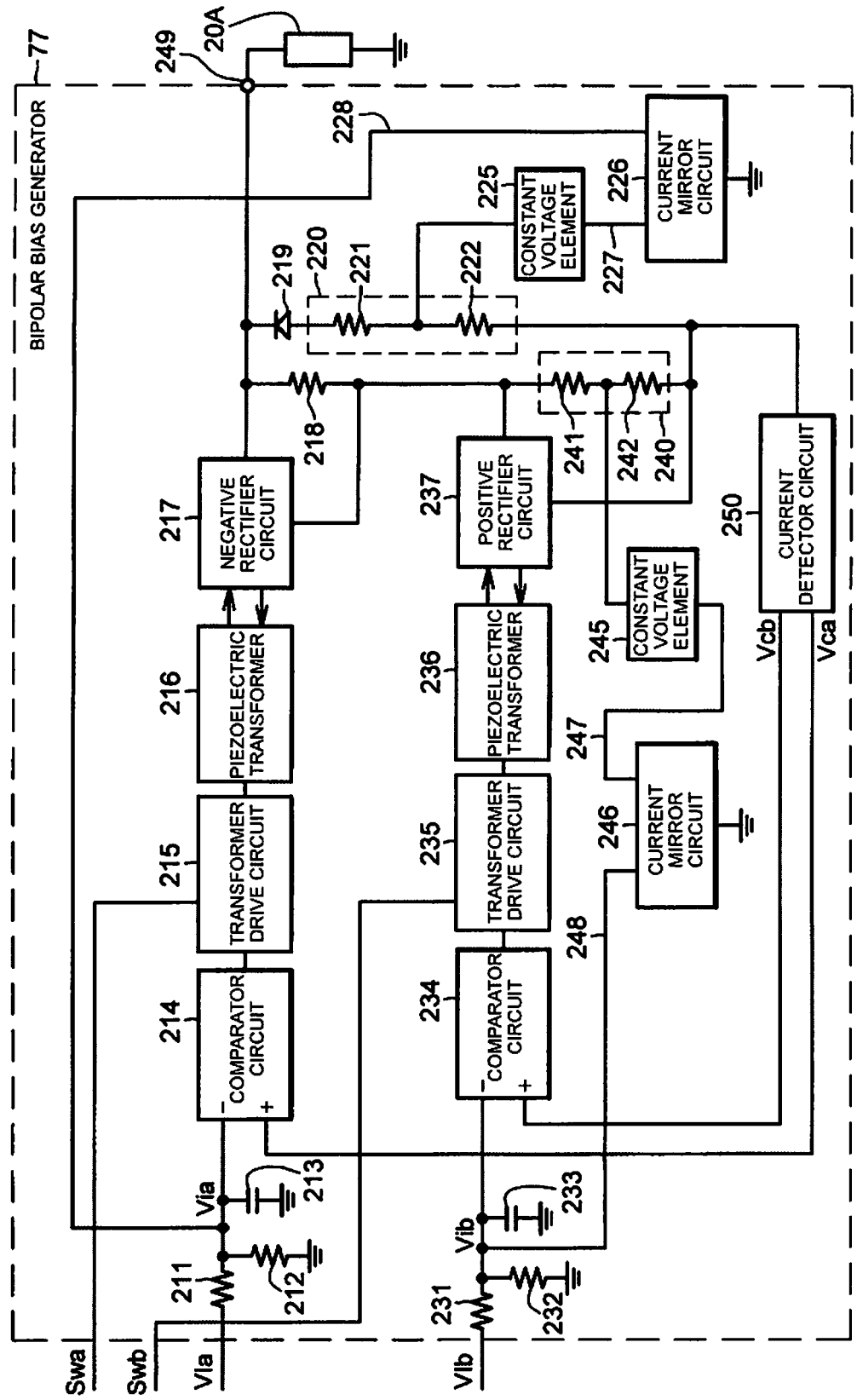
FIG. 19 is a diagram illustrating a more specific configuration of the bipolar bias generator according to Embodiment 3.

FIG. 19 is a diagram illustrating a schematic configuration of bipolar bias generator 77.

As illustrated in FIG. 19, bipolar bias generator 77 includes, as a configuration to generate a negative bias: resistors 211 and 212 configured to generate an indicator voltage (input voltage) VIa by lowering the inputted indicator voltage VIa; capacitor 213 configured to remove an unnecessary voltage component such as noise; comparator circuit 214; piezoelectric transformer 216; transformer drive circuit 215 configured to drive piezoelectric transformer 216; and negative rectifier circuit 217 configured to generate negative rectified voltage RVna of a reference potential (ground potential) or less by rectifying the output from piezoelectric transformer 216. Power-supply output terminal 249 can supply load 20A with an output voltage (negative bias) and an output current generated based on rectified voltage RVna.

Transformer drive circuit 215 drives piezoelectric transformer 216 when the signal level of bias output control signal SWa is at the H level, and does not drive piezoelectric transformer 216 when the signal level of bias output control signal SWa is at the L level.

Negative rectifier circuit 217 includes an output terminal to output negative rectified voltage RVna and an output terminal to output positive rectified voltage RVpa having an opposite polarity to that of rectified voltage RVna. Also, resistor 218 is interposed between the output terminals. Moreover, in bipolar bias generator 77, negative rectifier circuit 217 is connected to current detector circuit 250 through voltage-divider circuit 240.

Current detector circuit 250 has a function to generate comparison voltage Vca corresponding to an output current to load 20A based on the output from negative rectifier circuit 217. Comparator circuit 214 compares comparison voltage Vca inputted from current detector circuit 250 with indicator voltage VIa, and controls the operation of transformer drive circuit 215 so as to reduce the difference (difference absolute value) between comparison voltage Vca and indicator voltage VIa. Thus, feedback control, i.e., constant current control is executed so that the output current coincides with a current specified by indicator voltage VIa.

Bipolar bias generator 77 further includes: high-voltage diode 219; voltage-divider circuit 220 configured to generate divided voltage Rvna by dividing rectified voltage RVna; constant voltage element 225 to which divided voltage Rvna is applied as a reverse bias voltage; current mirror circuit 226 connected in series with constant voltage element 225 through current path 227; and current path 228 electrically connecting current mirror circuit 226 with an input terminal of comparator circuit 214.

A cathode of high-voltage diode 219 is connected to a voltage output terminal of negative rectifier circuit 217 and power-supply output terminal 249, while an anode of high-voltage diode 219 is connected to voltage-divider circuit 220. Voltage-divider circuit 220 includes voltage-dividing resistors 221 and 222 connected in series between the anode of high-voltage diode 219 and the input terminal of current detector circuit 250. Divided voltage Rvna is generated at a connection point between voltage-dividing resistors 221 and 222. Current mirror circuit 226 is connected to two current paths 227 and 228, and can allow a current proportional to a current flowing through one current path 227 to flow through the other current path 228.

During the negative bias output, when the output voltage value is larger than a predetermined lower limit THna, constant voltage element 225 is not conducted. On the other hand, when the output voltage value is reduced to reach lower limit THna, constant voltage element 225 operates as a constant voltage source to clamp divided voltage Rvna, thereby limiting the reduction in output voltage. Also, in this event, constant voltage element 225 is conducted to allow a constant current to flow through current path 227 and current mirror circuit 226. Current mirror circuit 226 allows a current proportional to the current flowing through current path 227 to flow through current path 228, and thus allows a current to flow through resistor 211, thereby lowering indicator voltage VIa. Thus, bipolar bias generator 77 can protect load 20A from overvoltage during the negative bias output and also surely prevent any intermittent output of voltage to load 20A.

Meanwhile, bipolar bias generator 77 includes, as a configuration to generate a positive bias: resistors 231 and 232 configured to generate indicator voltage (input voltage) VIb by lowering the inputted indicator voltage VIb; capacitor 233 configured to remove an unnecessary voltage component such as noise; comparator circuit 234; piezoelectric transformer 236; transformer drive circuit 215 configured to drive piezoelectric transformer 236; and positive rectifier circuit 237 configured to generate positive rectified voltage RVpb of a reference potential (ground potential) or more by rectifying the output from piezoelectric transformer 236. Power-supply output terminal 249 can supply load 20A with an output voltage (positive bias) and an output current generated based on rectified voltage RVpb.

Transformer drive circuit 235 drives piezoelectric transformer 236 when the signal level of bias output control signal SWb is at the H level, and does not drive piezoelectric transformer 236 when the signal level of bias output control signal SWb is at the L level.

Positive rectifier circuit 237 includes output terminals to output positive rectified voltage RVpa, and voltage-divider circuit 240 is interposed between the output terminals. Moreover, in bipolar bias generator 77, positive rectifier circuit 237 is connected to current detector circuit 250 through voltage-divider circuit 240.

Current detector circuit 250 has a function to generate comparison voltage Vcb corresponding to an output current to load 20A based on the output from positive rectifier circuit 237. Comparator circuit 234 compares comparison voltage Vcb inputted from current detector circuit 250 with indicator voltage VIb, and controls the operation of transformer drive circuit 235 so as to reduce the difference (difference absolute value) between comparison voltage Vcb and indicator voltage VIb. Thus, feedback control, i.e., constant current control, is executed so that the output current coincides with a current specified by indicator voltage VIb.

Voltage-divider circuit 240 includes voltage-dividing resistors 241 and 242 which are connected in series with each other. Divided voltage Rvpb (RVpb>Rvpb) is generated at a connection point between voltage-dividing resistors 241 and 242. Bipolar bias generator 77 includes: constant voltage element 245 to which divided voltage Rvpb is applied as a reverse bias voltage; current mirror circuit 246 connected in series with constant voltage element 245 through current path 247; and current path 248 electrically connecting current mirror circuit 246 with an input terminal of comparator circuit 234. Current mirror circuit 246 is connected to two current paths 247 and 248, and can allow a current proportional to a current flowing through one current path 247 to flow through the other current path 248.

During a positive bias output, when the value of the output voltage to load 20A is below a predetermined upper limit THpb, constant voltage element 245 is not conducted. On the other hand, when the output voltage value is increased to reach upper limit THpb, constant voltage element 245 operates as a constant voltage source to clamp divided voltage Rvpb, thereby limiting the increase in output voltage. Also, in this event, constant voltage element 245 is conducted to allow a constant current to flow through current path 247 and current mirror circuit 246. Current mirror circuit 246 allows a current proportional to the current flowing through current path 247 to flow through current path 248, and thus allows a current to flow through resistor 231, thereby lowering indicator voltage Vib. Thus, bipolar bias generator 77 can protect load 20A from overvoltage during positive bias output and also surely prevent any intermittent output of voltage to load 20A.

Figure 20:
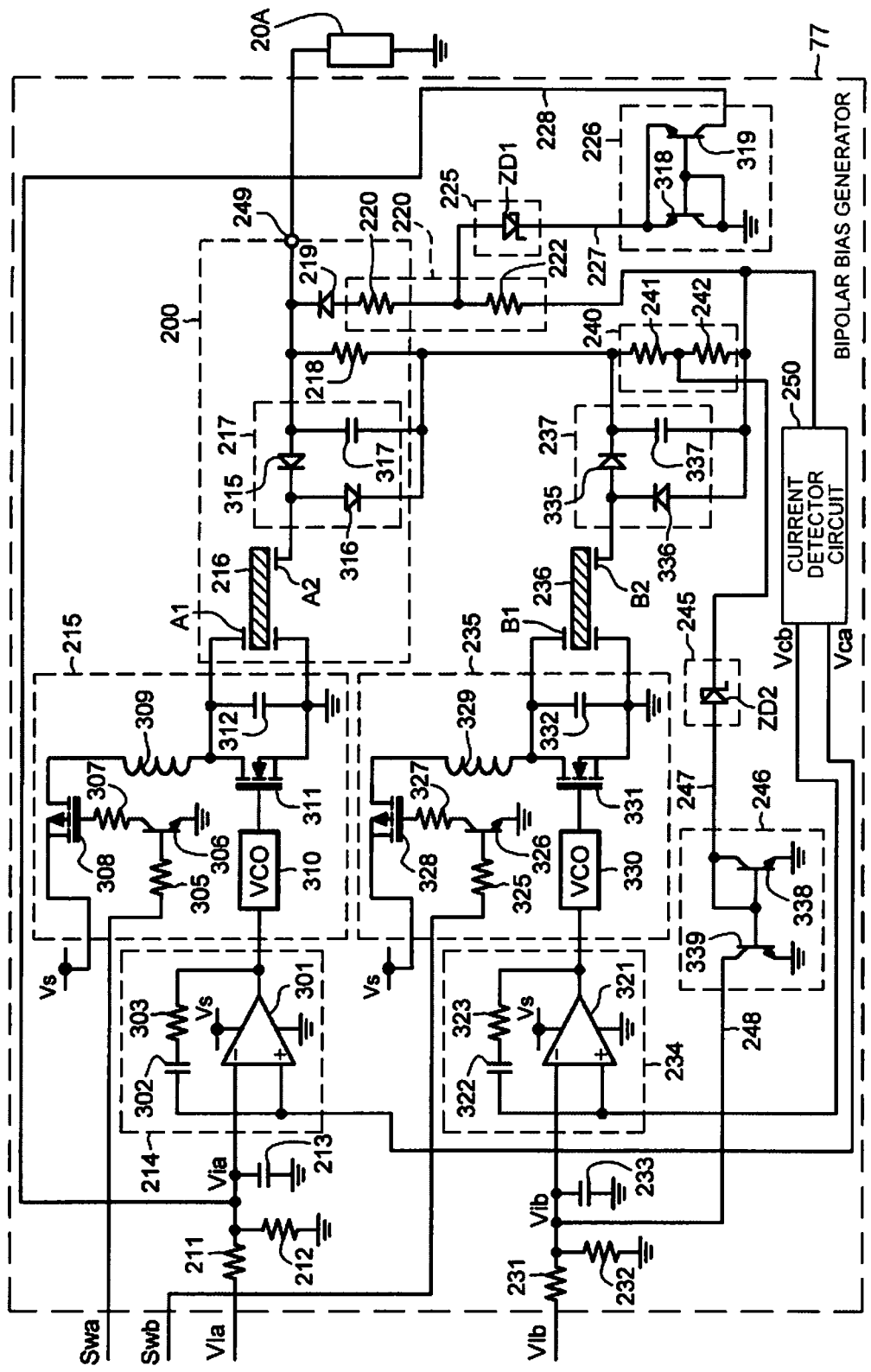
FIG. 20 is a diagram illustrating a circuit configuration example of the bipolar bias generator.

Next, with reference to FIG. 20, a description is given of a more specific circuit configuration of bipolar bias generator 77. FIG. 20 is a diagram illustrating a circuit configuration example of bipolar bias generator 77.

As illustrated in FIG. 20, comparator circuit 214 for generating a negative bias includes operation amplifier 301 configured to operate using positive supply voltage Vs (e.g., 24 volts) and a negative supply voltage (ground potential). Comparator circuit 214 also includes capacitor 302 and resistor 303, which are connected in parallel to operation amplifier 301, between a non-inverting input terminal (plus terminal) of operation amplifier 301 and an output terminal thereof. Capacitor 302 and resistor 303 are connected in series with each other. Also, indicator voltage Via is inputted to an inverting input terminal (minus terminal) of operation amplifier 301.

Transformer drive circuit 215 includes: an npn-type bipolar transistor 306; power-supply switching element 308 that is a p-channel FET (field-effect transistor); inductor 309; voltage control oscillator (VCO) 310; and drive switching element 311 that is an n-channel power MOSFET. Bipolar transistor 306 has: a base to which bias output control signal SWa is supplied through resistor 305; and an emitter to which a ground potential is applied. A collector of bipolar transistor 306 is connected to a control terminal (gate) of switching element 308 through resistor 307. Also, a drain of switching element 308 is connected to a drain of drive switching element 311 through inductor 309. Drive switching element 311 has: a gate to which an output signal from VCO 310 is inputted; and a source to which the ground potential is applied.

One end of inductor 309 is connected to power-supply switching element 308, while the other end of inductor 309 is connected to one end of capacitor 312. The ground potential is applied to the other end of capacitor 312. Capacitor 312 and inductor 309 constitute a resonance circuit.

When the signal level of bias output control signal SWa is at the L level, the collector and emitter of bipolar transistor 306 are not conducted. When the signal level of bias output control signal SWa becomes at the H level, a collector potential of bipolar transistor 306 is lowered to set power-supply switching element 308 in an ON state. Thus, power-supply voltage Vs is applied to the drain of drive switching element 311 through inductor 309. VCO 310 outputs a signal having a frequency corresponding to the input voltage from comparator circuit 214. Drive switching element 311 performs a switching operation (ON/OFF operation) according to the output signal of VCO 310 applied to the gate.

Piezoelectric transformer 216 is a transformer having a piezoelectric vibrator such as a piezoelectric ceramic plate. Piezoelectric transformer 216 can increase an input voltage applied to primary-side electrode A1 at an increase rate corresponding to the frequency of the input voltage, thereby outputting a high voltage from secondary-side electrode A2.

Negative rectifier circuit 217 includes: high-voltage half-wave rectifier diodes 315 and 316 connected to secondary-side electrode A2 in piezoelectric transformer 216; and high-voltage capacitor 317. One half-wave rectifier diode 315 has a cathode connected to secondary-side electrode A2, and outputs a negative voltage by half-wave rectifying the increased voltage inputted to the cathode. Capacitor 317 generates negative rectified voltage RVna by smoothing the negative voltage. The other half-wave rectifier diode 316 has an anode connected to secondary-side electrode A2, and outputs a positive voltage by half-wave rectifying the increased voltage inputted to the anode. Capacitor 317 generates positive rectified voltage RVpa by smoothing the positive voltage.

Here, piezoelectric transformer 216, negative rectifier circuit 217, high-voltage resistor 218, high-voltage diode 219 and voltage-dividing resistor 221 are sealed with a highly insulating material, such as an epoxy resin, to form molded piezoelectric transformer 200.

Constant voltage element 225 illustrated in FIG. 20 includes zener diode ZD1. The anode of zener diode ZD1 is connected to voltage-divider circuit 220, while the cathode of zener diode ZD1 is connected to current mirror circuit 226 through current path 227. When a reverse bias equal to or greater than the zener voltage (e.g., 12 volts) is applied to both ends of zener diode ZD1, zener diode ZD1 breaks down and operates as a constant voltage source (limiter circuit).

Current mirror circuit 226 includes a pair of npn-type bipolar transistors 318 and 319. The bases of bipolar transistors 318 and 319 are connected to each other, and a ground potential is applied thereto. The ground potential is applied to the collector of one bipolar transistor 318, and the emitter thereof is connected to the cathode of zener diode ZD1. The emitter of the other bipolar transistor 319 is also connected to the cathode of zener diode ZD1. The collector of bipolar transistor 319 is connected to an inverting input terminal (minus terminal) of operation amplifier 301 in comparator circuit 214 through current path 228. In current mirror circuit 226, the sum of the current flowing between the collector and emitter of one bipolar transistor 318 and the current flowing between the collector and emitter of the other bipolar transistor 319 becomes approximately equal to the current flowing through zener diode ZD1.

Figure 21:
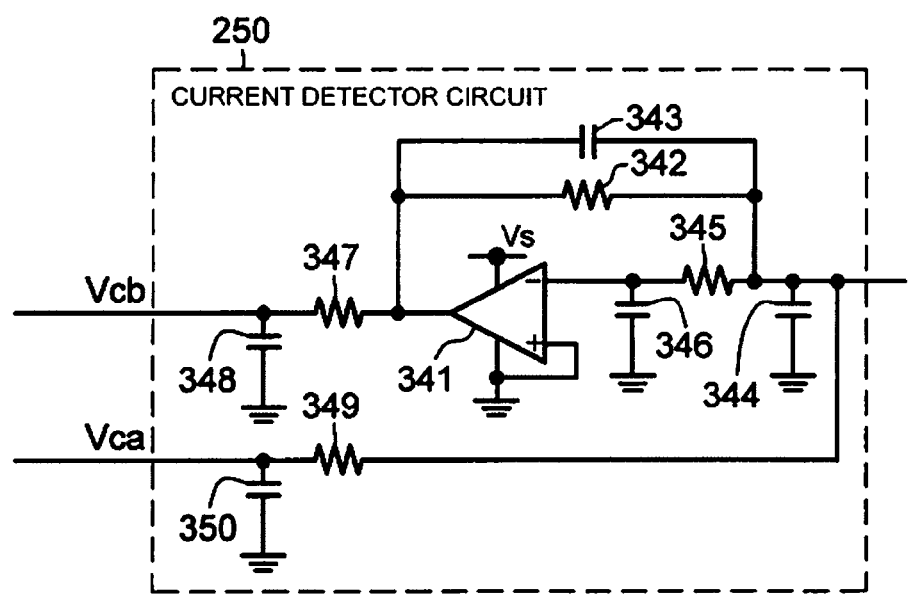
FIG. 21 is a diagram illustrating a circuit configuration of a current detector circuit according to Embodiment 3.

FIG. 21 is a diagram illustrating a circuit configuration of current detector circuit 250. As illustrated in FIG. 21, current detector circuit 250 includes operation amplifier 341 configured to operate using positive supply voltage Vs (e.g., 24 volts) and a negative supply voltage (ground potential). A reference potential (ground potential) is inputted to a non-inverting input terminal (plus terminal) of operation amplifier 341. Current detector circuit 250 also includes current detection resistor 342 and capacitor 343, which are connected in parallel to operation amplifier 341, between an inverting input terminal (minus terminal) of operation amplifier 341 and an output terminal thereof. Current detection resistor 342 and capacitor 343 are connected in parallel with each other. Furthermore, in current detector circuit 250, a pair of resistor 347 and capacitor 348 to form a filter for smoothing the output of operation amplifier 341, and a pair of resistor 345 and capacitors 346 and 344 to form a filter for smoothing the input to current detector circuit 341, are provided. Resistor 347 and capacitor 348 can generate comparison voltage Vcb by smoothing the output of operation amplifier 341. Comparison voltage Vcb is used in comparator circuit 234 for generating a positive bias to be described later.

Meanwhile, as illustrated in FIG. 21, a filter including a pair of resistor 349 and capacitor 350 is connected to the input terminal of current detector circuit 250. The input terminal is connected to the inverting input terminal of operation amplifier 341 through resistor 345, and is also connected to the output terminal of operation amplifier 341 through current detection resistor 342. Resistor 349 and capacitor 350 can generate comparison voltage Vca by smoothing the voltage of the input terminal. As illustrated in FIG. 20, comparison voltage Vca is inputted to the non-inverting input terminal of operation amplifier 301 in comparator circuit 214.

During a negative bias output, a sink current in operation amplifier 341 flows through current detection resistor 342 illustrated in FIG. 21. In this event, the potential of the inverting input terminal (minus terminal) of operation amplifier 341 varies with the current flowing through current detection resistor 342, while the potential of the output terminal of operation amplifier 341 becomes the ground potential. When a protection circuit including constant voltage element 225 and current mirror circuit 226 is not in operation, a current approximately equal to the current flowing through load 20A flows through current detection resistor 342. Therefore, current detector circuit 250 can output comparison voltage Vcb corresponding to the current flowing through load 20A.

During a negative bias output, operation amplifier 301 in comparator circuit 214 compares comparison voltage Vca with indicator voltage Via, and supplies VCO 310 with a voltage such that comparison voltage Vca becomes equal to indicator voltage Via. Thus, this good balance between comparison voltage Vca and indicator voltage Via stabilizes the output of comparator circuit 214.

Meanwhile, as illustrated in FIG. 20, comparator circuit 234 for generating a positive bias includes operation amplifier 321 configured to operate using positive supply voltage Vs (e.g., 24 volts) and a negative supply voltage (ground potential). Comparator circuit 234 also includes capacitor 322 and resistor 323, which are connected in parallel to operation amplifier 321, between a non-inverting input terminal (plus terminal) of operation amplifier 321 and an output terminal thereof. Capacitor 322 and resistor 323 are connected in series with each other. Also, indicator voltage Vib is inputted to an inverting input terminal (minus terminal) of operation amplifier 321.

Transformer drive circuit 235 includes: an npn-type bipolar transistor 326; power-supply switching element 328 that is a p-channel FET (field-effect transistor); inductor 329; voltage control oscillator (VCO) 330; and drive switching element 311 that is an n-channel power MOSFET. Bipolar transistor 326 has: a base to which bias output control signal SWb is supplied through resistor 325; and an emitter to which a ground potential is applied. The collector of bipolar transistor 326 is connected to the control terminal (gate) of switching element 328 through resistor 327. Also, the drain of switching element 328 receives power-supply voltage Vc (e.g., 24 volts), and the source of switching element 328 is connected to the drain of drive switching element 331 through inductor 329. Drive switching element 331 has: a gate to which an output signal from VCO 330 is inputted; and a source to which the ground potential is applied.

One end of inductor 329 is connected to power-supply switching element 328, while the other end of inductor 329 is connected to one end of capacitor 332. The ground potential is applied to the other end of capacitor 332. Capacitor 332 and inductor 329 constitute a resonance circuit.

When the signal level of bias output control signal SWb is at the L level, the collector and emitter of bipolar transistor 326 are not conducted. When the signal level of bias output control signal SWb becomes at the H level, the collector potential of bipolar transistor 326 is lowered to set power-supply switching element 328 in an ON state. Thus, power-supply voltage Vs is applied to the drain of drive switching element 331 through inductor 329. VCO 330 outputs a signal having a frequency corresponding to the input voltage from comparator circuit 234. Drive switching element 331 performs a switching operation (ON/OFF operation) according to the output signal of VCO 310 applied to the gate.

Piezoelectric transformer 236 is a transformer having a piezoelectric vibrator such as a piezoelectric ceramic plate. Piezoelectric transformer 236 can increase an input voltage applied to primary-side electrode B1 at an increase rate corresponding to the frequency of the input voltage, thereby outputting a high voltage from secondary-side electrode B2.

Positive rectifier circuit 237 includes: high-voltage half-wave rectifier diodes 335 and 336 connected to secondary-side electrode B2 in piezoelectric transformer 236; and high-voltage capacitor 337. One half-wave rectifier diode 335 has an anode connected to secondary-side electrode B2, and outputs a positive voltage by half-wave rectifying the increased voltage inputted to the anode. Capacitor 337 generates positive rectified voltage RVpb by smoothing the positive voltage. The other half-wave rectifier diode 336 has a cathode connected to secondary-side electrode B2, and outputs a negative voltage by half-wave rectifying the increased voltage inputted to the cathode. Capacitor 337 generates negative rectified voltage RVnb by smoothing the negative voltage.

Constant voltage element 225 illustrated in FIG. 20 includes zener diode ZD2. A cathode of zener diode ZD2 is connected to voltage-divider circuit 240, while an anode of zener diode ZD2 is connected to current mirror circuit 246 through current path 247. When a reverse bias equal to or greater than the zener voltage (e.g., 12 volts) is applied to both ends of zener diode ZD2, zener diode ZD2 breaks down and operates as a constant voltage source (limiter circuit).

Current mirror circuit 246 includes a pair of npn-type bipolar transistors 338 and 339. The bases of bipolar transistors 338 and 339 are connected to each other, and a ground potential is applied to the emitters of bipolar transistors 338 and 339. The collector of one bipolar transistor 338 and the base thereof are short-circuited and are connected to the anode of zener diode ZD2. The collector of the other bipolar transistor 339 is connected to the inverting input terminal (minus terminal) of operation amplifier 321 in comparator circuit 234 through current path 248. In current mirror circuit 246, a current approximately equal to the current flowing between the collector and emitter of one bipolar transistor 338 flows between the collector and emitter of the other bipolar transistor 339.

As illustrated in FIG. 21, current detector circuit 250 has the same circuit configuration as that of current detector circuit 108 (FIG. 6) in Embodiment 1. During a positive bias output, the source current in operation amplifier 341 flows through current detection resistor 342 illustrated in FIG. 21. When a protection circuit that includes constant voltage element 245 and current mirror circuit 246 is not in operation, a detection current, in an approximate amount equal to the current flowing through load 20A, flows through current detection resistor 342. The potential difference between the two ends of current detection resistor 342 is increased with an increase in the amount of current flowing through current detection resistor 342. Therefore, current detector circuit 250 can output comparison voltage Vca corresponding to the current flowing through load 20A.

Operation amplifier 321 in comparator circuit 234 compares comparison voltage Vcb inputted from current detector circuit 250 with indicator voltage Vib, and supplies VCO 330 with a voltage such that comparison voltage Vcb becomes equal to indicator voltage Vib. Thus, this good balance between comparison voltage Vcb and indicator voltage Vib stabilizes the output of comparator circuit 234.

Next, a description is given of an operation example of bipolar bias generator 77 having the above configuration.

Assuming that the electric resistance of current detector circuit 250 is 30 KΩ, an absolute value of an indicator current value corresponding to the potential of 3.3 volts can be set to 110 μA (=3.3 V/30 KΩ). In this case, printer engine controller 63 sets an indicator current value within a range of 0 to −110 μA, which is proportional to indicator voltage VIa within a range of 0.0 to 3.3 volts, during a negative bias output (when the signal level of bias output control signal SWa is at the H level). On the other hand, printer engine controller 63 sets an indicator current value within a range of 0 to +110 μA, which is proportional to indicator voltage VIb within a range of 0.0 to 3.3 volts, during a positive bias output (when the signal level of bias output control signal SWb is at the H level).

Also, during the negative bias output, high-voltage setting unit 71B can generate a $2^8$ bit DAC set value within a range of 0 hex to FF hex, which is proportional to the indicator current value within the range of 0 to −110 μA. On the other hand, during the positive bias output, high-voltage setting unit 71B can generate a $2^8$ bit DAC set value within a range of 0 hex to FF hex, which is proportional to the indicator current value within the range of 0 to +110 μA.

During the negative bias output, when printer engine controller 63 sets the indicator current value to −40 μA, the DAC set value becomes 93 in decimal notation and 5D hex in hexadecimal notation as shown in the following expression.

$$(255/110\ \mu A) \times |-40\ \mu A| \approx 93$$

Comparator circuit 214 constitutes an integration circuit using operation amplifier 301 as illustrated in FIG. 20. Operation amplifier 301 changes the input voltage to VCO 310 so that comparison voltage Vca coincides with indicator voltage Via corresponding to the indicator current value. VCO 310 lowers the frequency of the output signal when the input voltage is lowered, thereby increasing the increase rate of piezoelectric transformer 216. With the increase in increase rate of piezoelectric transformer 216, the absolute value of output voltage RVna of negative rectifier circuit 217 is increased. On the other hand, VCO 310 increases the frequency of the output signal when the input voltage is increased, thereby lowering the increase rate of piezoelectric transformer 216. With the reduction in increase rate of piezoelectric transformer 216, the absolute value of output voltage RVna of negative rectifier circuit 217 is reduced.

The electric resistance of load 20A, which is dependent on bend roller 26A, backup roller 26B and intermediate transfer belt 21, is assumed to be within a range of about 10 M to 100 MΩ. In this case, bipolar bias generator 77 can generate rectified voltage RVna within a range of about −400 to −4000 V by executing a constant current control of −40 μA. Also, the potential of the inverting input terminal of operation amplifier 301 can be set to about 1.2 V when comparison voltage Vca coincides with indicator voltage Via corresponding to the indicator current value. In this event, assuming that the current flowing through voltage-dividing resistor 114 is Pi and the electric resistance of voltage-dividing resistor 114 is Ra, divided voltage Rvna generated in voltage-divider circuit 220 is as follows.

$$-1 \times Pi \times Ra + 1.2\ V$$

When divided voltage Rvna reaches the sum (protection operation start voltage) of the zener voltage of zener diode ZD1 and the potential difference (e.g., about 0.6 V) between the collector and emitter of bipolar transistor 318, zener diode ZD1 breaks down and starts the protection operation. This allows a current to flow through current path 228 and resistor 211, thereby lowering indicator voltage Via. As a result, overvoltage protection is performed.

Meanwhile, during the positive bias output, when printer engine controller 63 sets the indicator current value to +20 μA, the DAC set value becomes 46 in decimal notation and 2E hex in hexadecimal notation as shown in the following expression.

$$(255/110\ \mu A) \times 20\ \mu A \approx 46$$

In this case, when piezoelectric transformer 236 is driven to output positive rectified voltage RVpb, the inverting input terminal (minus terminal) of operation amplifier 341 tries to maintain the ground potential. When divided voltage Rvpb generated in voltage-divider circuit 240 reaches the sum (protection operation start voltage) of the zener voltage of zener diode ZD2 and the potential difference (e.g., about 0.6 V) between the collector and emitter of bipolar transistor 338, zener diode ZD2 breaks down and starts the protection operation. This allows a current to flow through current path 248 and resistor 231, thereby lowering indicator voltage Vib. As a result, overvoltage protection is performed.

While piezoelectric transformer 216 for negative bias output is sealed with a highly insulating material against high voltage, piezoelectric transformer 236 for positive bias output is not sealed (open). For this reason, it is preferable that the protection operation start voltage is about 2500 V and the upper limit of the protection operation start voltage is about 3000 V.

In this embodiment, the current detection resistor for positive bias output and the current detection resistor for negative bias output are the same, and current detection resistor 342 (FIG. 21) is used for the both. Also, as described above, in Embodiment 1, the electric resistance of resistor 102 (FIG. 6) can be set to 1 MΩ, for example. However, in this embodiment, the electric resistance of resistor 232 may be set to a low resistance value of less than 1 MΩ rather than such a high resistance value, thereby lowering the upper limit of current control range. Moreover, since the output current of negative rectifier circuit 217 flows through voltage-dividing resistor 241, the resistance value of voltage-dividing resistor 241 may be set to a low value. For example, assuming that the electric resistance of voltage-dividing resistor 241 is 10 MΩ, the zener voltage of zener diode ZD2 is 12 V, the potential difference between the collector and emitter of bipolar transistor 338 is 0.6 volts and the protection operation start voltage is 2500 V, the current flowing through voltage-dividing resistor 241 becomes 251.26 μA as shown in the following equation.

$$(2500\ V + 12.6\ V)/(10\ M\Omega) = 251.26\ \mu A$$

When the upper limit voltage is 3000 V, the current flowing through voltage-dividing resistor 241 becomes 301.26 μA as shown in the following equation.

$$(3000\ V + 12.6\ V)/(10\ M\Omega) = 301.26\ \mu A$$

Since a difference between the currents described above is 50 μA (=301.26 μA–251.26 μA), a voltage corresponding to 50 μA with indicator voltage 3.3 V can be set to 1.5 V as shown in the following equation.

30 KΩ×50 μA=1.5 V

For example, assuming that the resistance value of resistor 231 is 100 KΩ and the same current as the zener current flows through current mirror circuit 246, a reduction in indicator voltage can be set to 0.5 V. Also, in order to set the maximum indicator voltage to 2.0 V (=1.5 V+0.5 V), the electric resistance of resistor 232 may be set to about 150 KΩ as shown in the following expression.

100 KΩ×2V/(3.3V−2V)150 KΩ

As described above, high-voltage power supply device 70B of Embodiment 3 includes bipolar bias generator 77 using the piezoelectric transformer. Also in this case, an overvoltage protection operation can be slowly performed during the constant current control. Moreover, even when load 20A continues to have an anomaly in its electrical characteristics, a high-voltage output waveform to load 20A can be stabilized without oscillation. Thus, bipolar bias generator 77 can surely prevent any intermittence of high-voltage output by the overvoltage protection operation or oscillation of the high-voltage output waveform.

Therefore, image formation apparatus 1B of this embodiment can stably perform image formation even when the impedance of load 20A is increased more than expected. Moreover, even in a low-temperature environment where the roller resistance is increased, the overvoltage protection operation goes underway at startup immediately after power activation. Thus, there is no stopping of a print operation.

Embodiment 4

Next, Embodiment 4 according to the invention is described. Primary transfer bias generator 73 and bipolar bias generator 77 in Embodiments 1 and 2 described above are both constant current-controlled power supplies. Meanwhile, an image formation apparatus of this embodiment includes a primary transfer bias generator that is a constant voltage-controlled power supply to supply an approximately constant voltage to a load even when electrical characteristics of the load vary within a predetermined range.

Figure 22:
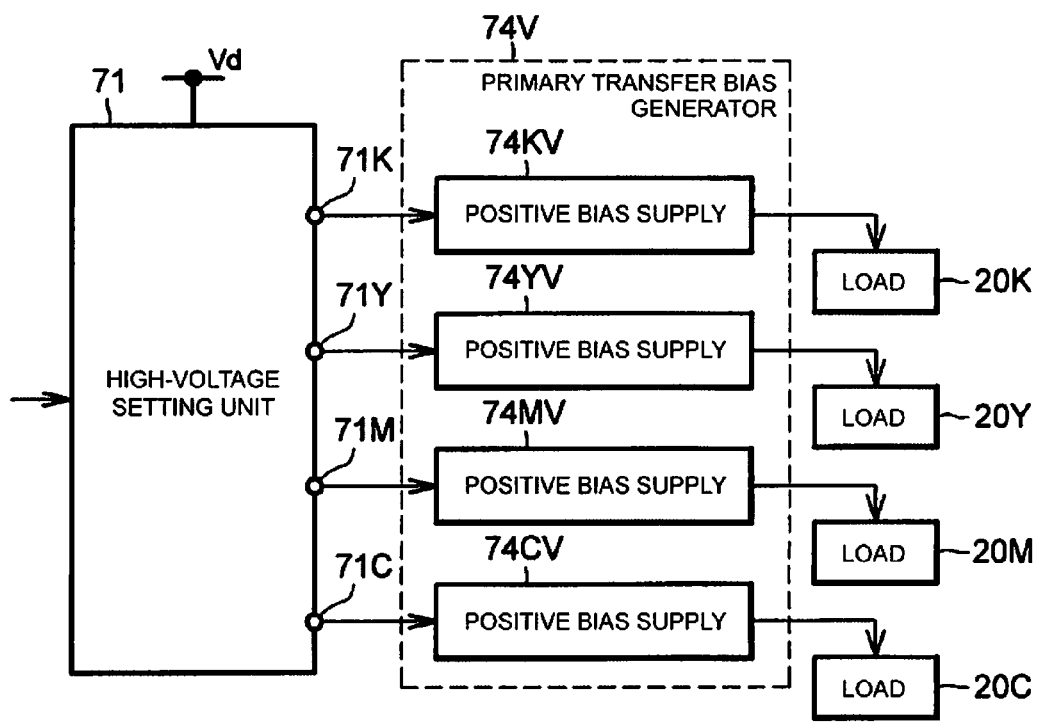
FIG. 22 is a block diagram illustrating a schematic configuration of a primary transfer bias generator of Embodiment 4 according to the invention.

FIG. 22 is a block diagram illustrating a schematic configuration of primary transfer bias generator 74V of Embodiment 4. The image formation apparatus of this embodiment has the same configuration as that of image formation apparatus 1 of Embodiment 1 except that the apparatus includes primary transfer bias generator 74V illustrated in FIG. 22 instead of primary transfer bias generator 74 of Embodiment 1.

As illustrated in FIG. 22, primary transfer bias generator 74V includes positive bias supplies 74KV, 74YV, 74MV and 74CV. Positive bias supplies 74KV, 74YV, 74MV and 74CV supply loads 20K, 20Y, 20M and 20C with positive transfer biases to transfer negatively-charged developer images onto print medium Pa. Positive bias supplies 74KV, 74YV, 74MV and 74CV operate according to four-system analog voltages, i.e., indicator voltages outputted from DAC output ports 71K, 71Y, 71M and 71C of high-voltage setting unit 71. Since positive bias supplies 74KV, 74YV, 74MV and 74CV all have the same configuration, only the configuration of positive bias supply 74KV is described in detail below.

Figure 23:
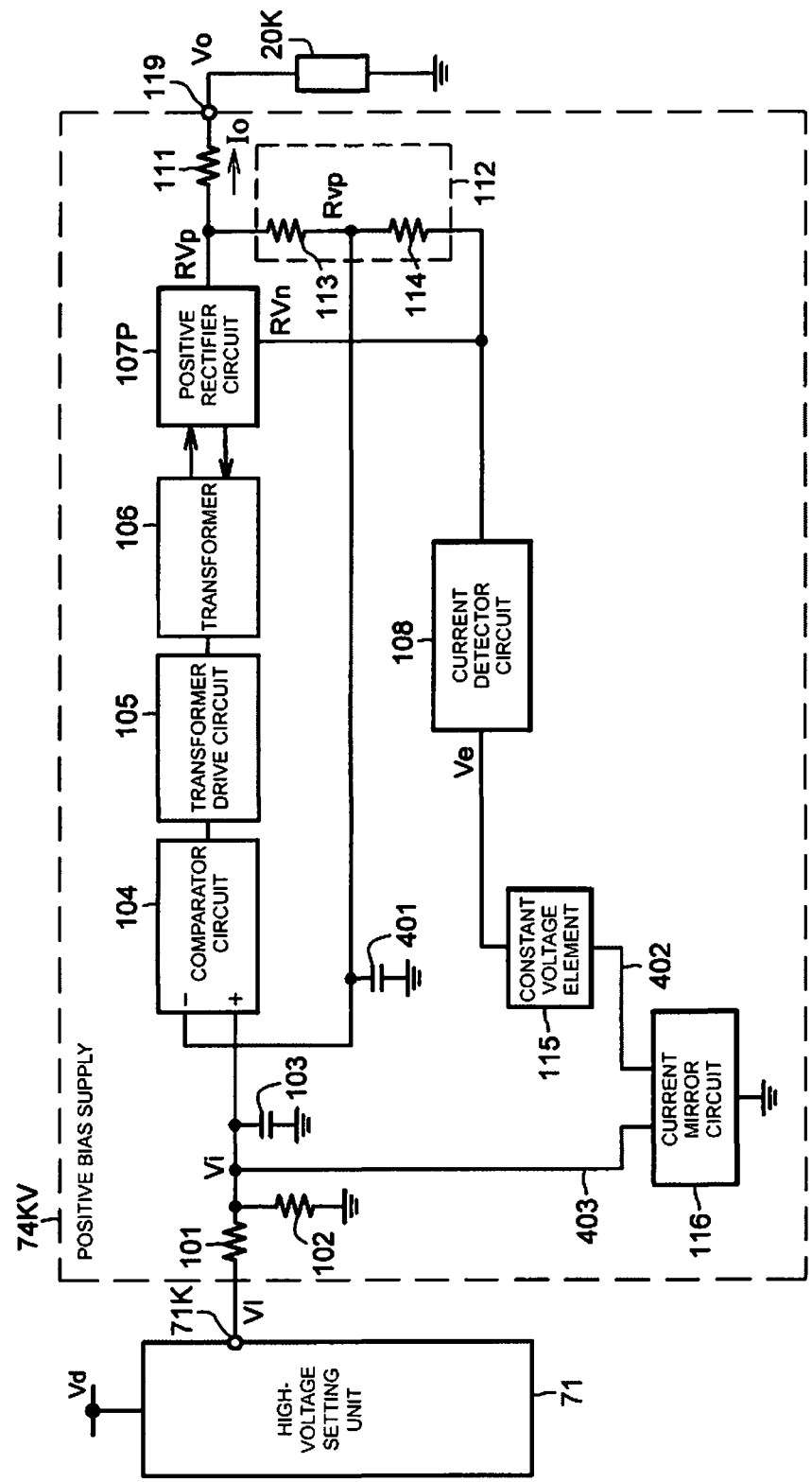
FIG. 23 is a diagram illustrating a schematic configuration of a positive bias supply.

FIG. 23 is a diagram illustrating a schematic configuration of positive bias supply 74KV. Positive bias supply 74KV generates a positive transfer bias according to indicator voltage VI inputted from DAC output port 71K of high-voltage setting unit 71. Positive bias supply 74KV is a constant voltage-controlled power supply capable of supplying an approximately constant voltage Vo to load 20K even when the electrical characteristics of load 20K vary within a predetermined range. A value of indicator voltage VI corresponds to a value of a target voltage (indicator voltage) to be supplied to load 20K.

As illustrated in FIG. 23, positive bias supply 74KV includes resistors 101 and 102, capacitor 103, comparator circuit 104, transformer drive circuit 105, transformer 106, voltage-divider circuit 112, positive rectifier circuit 107P, high-voltage resistor 111 and power-supply output terminal 119, as in the case of positive bias supply 74K of Embodiment 1.

Voltage-divider circuit 112 includes voltage-dividing resistors (series-connected resistors) 113 and 114 connected between an output terminal of positive rectifier circuit 107P and an input terminal of current detector circuit 108. Divided voltage Rvp is generated at a connection point between voltage-dividing resistors 113 and 114.

Comparator circuit 104 compares comparison voltage Vc to indicator voltage Vi, and controls the operation of transformer drive circuit 105 so as to reduce the difference (difference absolute value) between comparison voltage Vc and indicator voltage Vi. Thus, feedback control, i.e., constant current control is executed so that output current Ip coincides with a current specified by indicator voltage Vi.

Positive bias supply 74KV also includes current detector circuit 108 configured to generate voltage Ve corresponding to output current Vo based on the output from positive rectifier circuit 107P. Positive rectifier circuit 107P also generates negative rectified voltage RVn, which is opposite to positive rectified voltage RVp. Positive rectifier circuit 107P can generate reverse bias voltage Ve corresponding to output current Io based on rectified voltages RVp and RVn.

Positive bias supply 74KV further includes: constant voltage element 115 to which output voltage Ve of current detector circuit 108 is applied as a reverse bias voltage; current mirror circuit 116 connected in series with constant voltage element 115 through current path 402; and current path 403 electrically connecting current mirror circuit 116 with an input terminal of comparator circuit 104.

During constant voltage control, when the value of output current Io is below a predetermined upper limit THu, constant voltage element 115 is not conducted. On the other hand, when the value of output current Io is increased to reach upper limit THu, constant voltage element 115 operates as a constant voltage source to clamp output voltage Ve, thereby limiting the increase in output current to through current detector circuit 108. Also, in this event, constant voltage element 115 is conducted to allow a constant current to flow through current path 402 and current mirror circuit 116. Current mirror circuit 116 allows a current proportional to the current flowing through current path 402 to flow through current path 403, and thus allows a current to flow through resistor 101, thereby lowering indicator voltage Vi. Thus, positive bias supply 74KV can protect load 20K from overcurrent during the constant voltage control.

Figure 24:
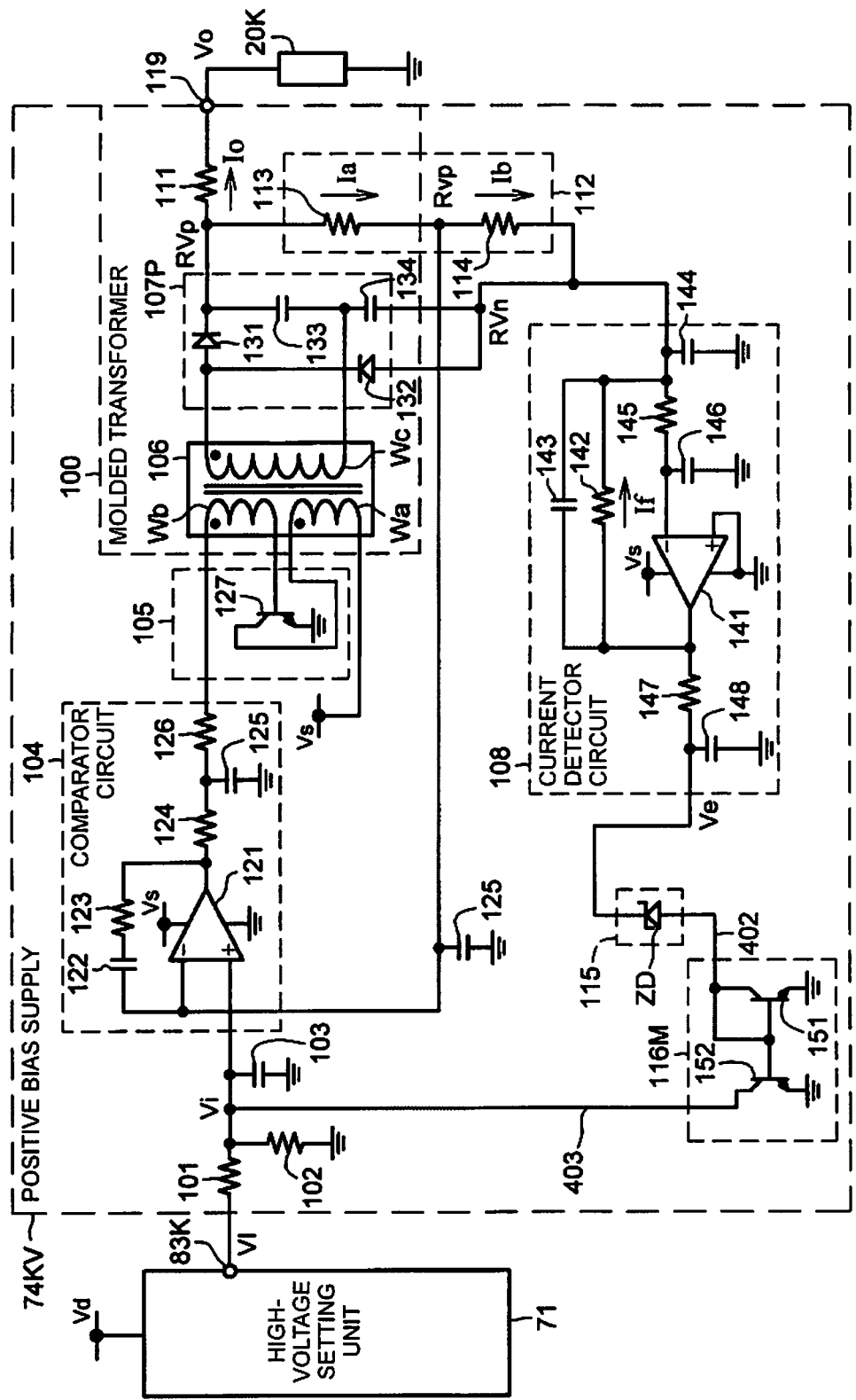
FIG. 24 is a diagram illustrating a circuit configuration example of the positive bias supply when an electromagnetic transformer is used.

Next, with reference to FIG. 24, a description is given of a more specific circuit configuration of positive bias supply 74KV. FIG. 24 is a diagram illustrating a circuit configuration example of positive bias supply 74KV when an electromagnetic transformer is used as transformer 106.

Comparator circuit 104, transformer drive circuit 105, molded transformer 100, current detector circuit 108, constant voltage element 115 and current mirror circuit 116 illustrated in FIG. 24 have the same circuit configurations as those of comparator circuit 104, transformer drive circuit 105, molded transformer 100, current detector circuit 108, constant voltage element 115 and current mirror circuit 116 illustrated in FIG. 6.

In current detector circuit 108, the output terminal of operation amplifier 141 discharges a source current after half-wave rectifier diode 132 in positive rectifier circuit 107P draws the current. For this reason, detection current If in an approximately equal amount to actual current Io flowing through load 20K flows through current detection resistor 142. Since a ground potential is applied to the non-inverting input terminal (plus terminal) of operation amplifier 141 that is negatively fed back, operation amplifier 141 tries to maintain the voltage of the inverting input terminal (minus terminal) at the ground potential. Accordingly, the output voltage of operation amplifier 141 is increased with an increase in the amount of current flowing through current detection resistor 142. Therefore, operation amplifier 141 can output a voltage corresponding to detection current Id from its output terminal.

The cathode of zener diode ZD in constant voltage element 115 is connected to the output terminal of current detector circuit 108, while the anode of zener diode ZD is connected to current mirror circuit 116 through current path 117. When a reverse bias equal to or greater than the zener voltage (e.g., 12 volts) is applied to both ends of zener diode ZD, zener diode ZD breaks down and operates as a constant voltage source (limiter circuit).

Current mirror circuit 116 includes a pair of npn-type bipolar transistors 151 and 152. The collector and the base of one bipolar transistor 151 are short-circuited and are connected to the anode of zener diode ZD. The collector of the other bipolar transistor 152 is connected to the non-inverting input terminal (plus terminal) of operation amplifier 121 in comparator circuit 104 through current path 403. In current mirror circuit 116, a current approximately equal to the current flowing between the collector and emitter of one bipolar transistor 151 flows between the collector and emitter of the other bipolar transistor 152.

The output voltage of comparator circuit 104 is approximately zero volt in an initial state. When nonzero indicator voltage VI is inputted to positive bias supply 74KV, the output voltage of comparator circuit 104 is increased in response to the input, switching bipolar transistor 127 from an OFF state to an ON state (conduction state). Thus, electromagnetic transformer 106 starts oscillation (self-oscillation) by LC resonance to generate an alternating-current voltage in secondary winding Wc. Positive rectifier circuit 107P generates positive rectified voltage RVp and negative rectified voltage RVn by half-wave rectifying and smoothing the alternating-current voltage.

Operation amplifier 121 in comparator circuit 104 compares comparison voltage (divided voltage) Rvp with indicator voltage Vi. When comparison voltage Rvp is lower than indicator voltage Vi, operation amplifier 121 increases the collector current of bipolar transistor 127 by increasing the output voltage of operation amplifier 121. On the other hand, when comparison voltage Rvp is higher than indicator voltage Vi, operation amplifier 121 reduces the collector current of bipolar transistor 127 by lowering the output voltage of operation amplifier 121. As described above, comparator circuit 104 controls the base current of bipolar transistor 127 such that comparison voltage Rvp becomes equal to indicator voltage Vi. Thus, this good balance between comparison voltage Rvp and indicator voltage Vi stabilizes the output of comparator circuit 104.

As described above, in positive bias supply 74KV of Embodiment 4, when output current Io reaches the upper limit during the constant voltage control for load 20K, constant voltage element 115 operates as a constant voltage source and clamps the output voltage Ve of current detector circuit 108. Thus, an increase in output current Io can be limited. At the same time, current mirror circuit 116 lowers input voltage Vi to comparator circuit 104 by allowing a current proportional to the current flowing through constant voltage element 115 to flow through current path 118. Thus, positive bias supply 74KV can slowly perform an overcurrent protection operation during the constant voltage control. Moreover, even when load 20K continues to have an anomaly in its electrical characteristics, a high-voltage output waveform to load 20K can be stabilized without oscillation. The other positive bias supplies 74YV, 74MV and 74CV operate in the same manner.

Therefore, the image formation apparatus of this embodiment can stably perform image formation even when an anomaly occurs in the impedance of primary transfer rollers 25K, 25Y, 25M and 25C.

Modified Examples of Embodiments 1 to 4

While the various embodiments according to the invention are described above with reference to the drawings, these embodiments are examples of the invention and various other modes can also be adopted. For example, a current mirror circuit including Darlington-connected bipolar transistors may be used, instead of current mirror circuits 116, 116N, 226 and 246 of Embodiments 1 to 4, to increase the current amplification factor.

Figure 25:
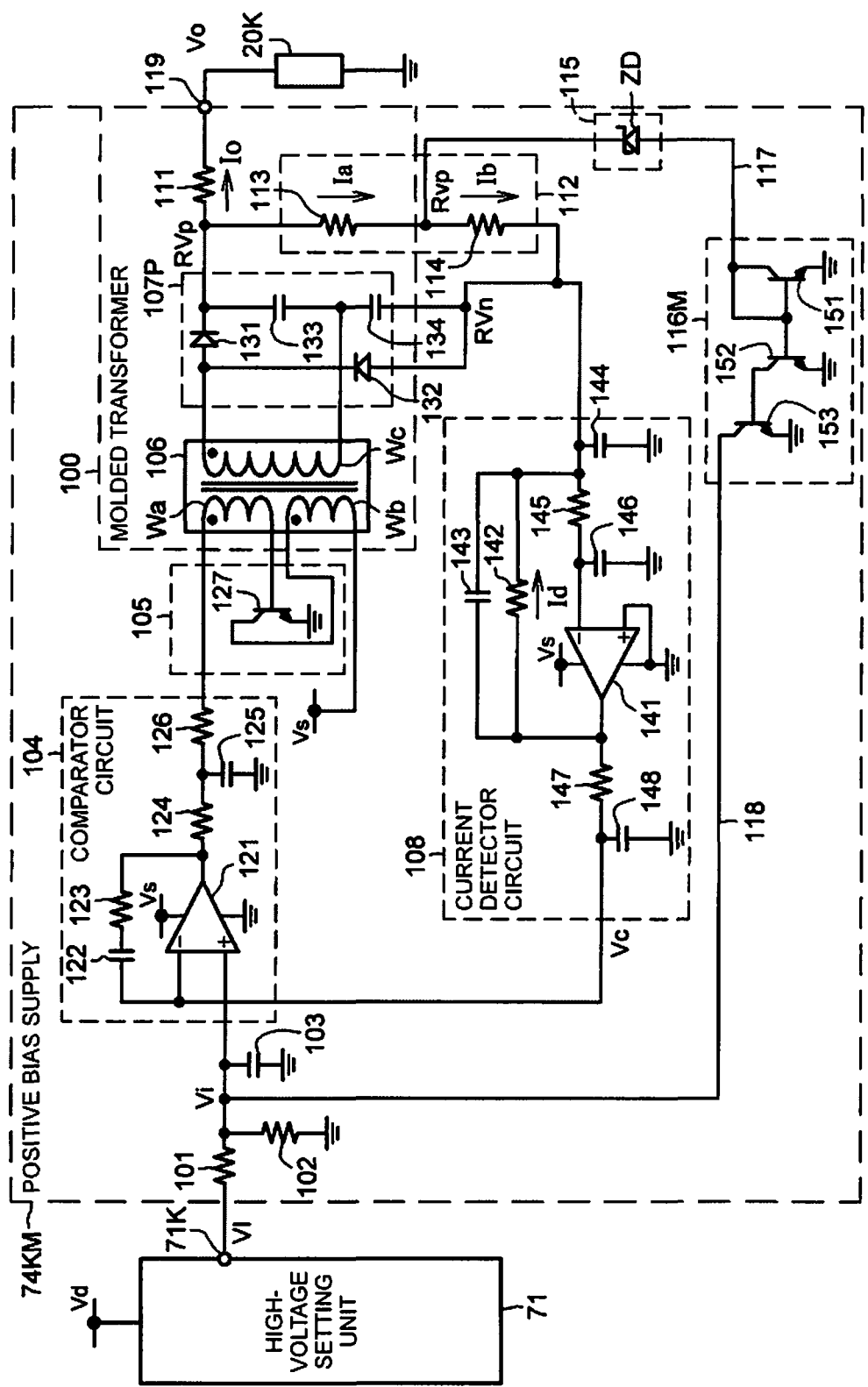
FIG. 25 is a diagram illustrating a circuit configuration of a modified example of the positive bias supply according to Embodiment 1.

FIG. 25 is a diagram illustrating a circuit configuration of positive bias supply 74KM that is a modified example of positive bias supply 74K of Embodiment 1. Positive bias supply 74KM has the same configuration as that of positive bias supply 74K except that the positive bias supply 74KM includes current mirror circuit 116M instead of current mirror circuit 116. Current mirror circuit 116M of this embodiment includes a bipolar transistor 151 and a pair of Darlington-connected npn-type bipolar transistors 152 and 153. The bases of bipolar transistors 151 and 152 are connected to each other, and a ground potential is applied to the emitters of bipolar transistors 151 and 152. The collector of bipolar transistor 151 and the base thereof are short-circuited and are connected to the anode of zener diode ZD. The collector of bipolar transistor 152 is connected to the base of the other bipolar transistor 153. The ground potential is applied to the emitter of the bipolar transistor 153, and the collector of bipolar transistor 153 is connected to the non-inverting input terminal (plus terminal) of operation amplifier 121 in comparator circuit 104 through current path 118. In this way, the Darlington connection of npn-type bipolar transistors 152 and 153 can increase the current flowing through current path 118. In this case, a reduction in the resistance value of resistor 101 can slow down a change in the indicator voltage and can also reduce the difference between the upper and lower limit voltages in the protection operation region.

Note that the current flowing through the protection circuit, being in the order of microamperes, is minute. Thus, inexpensive surface-mountable components can be used as zener diodes ZD, ZD1 and ZD2 or the bipolar transistors.

Moreover, the invention may be applied not only to the primary transfer bias generator but also to other bias generation sources.

Furthermore, the invention is not limited to a printer but can also be applied to a copying machine, a fax machine or an MFP (Multi Function Peripheral). Note that the MFP is an image formation apparatus having multiple functions of a copying machine, a printer, an image scanner, a fax machine and the like.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A power-supply device that supplies a load with power, comprising:
    a transformer;
    a transformer drive circuit configured to drive the transformer;
    a rectifier circuit configured to output a rectified voltage by rectifying an output from the transformer;
    a power-supply output terminal configured to supply the load with an output voltage and an output current generated based on the rectified voltage;
    a comparator circuit including an input terminal to which an indicator voltage is inputted, the comparator circuit configured to compare a comparison voltage corresponding to the output voltage or the output current with the indicator voltage and to control an operation of the transformer drive circuit so as to reduce a difference between the comparison voltage and the indicator voltage;
    a constant voltage element electrically connected to the power-supply output terminal and configured to limit the output voltage or the output current by operating as a constant voltage source when a value of the output voltage or the output current reaches a threshold;
    a current mirror circuit connected in series with the constant voltage element; and
    a current path electrically connecting the current mirror circuit to the input terminal of the comparator circuit, wherein
    the current mirror circuit is configured to lower the indicator voltage by allowing a current proportional to a current flowing through the constant voltage element to flow through the current path.

2. The power-supply device according to claim 1, further comprising:
    a current detector circuit configured to generate, as the comparison voltage, a voltage corresponding to the output current based on the rectified voltage outputted from the rectifier circuit, wherein
    the constant voltage element limits the output voltage by operating as the constant voltage source when the value of the output voltage reaches the threshold.

3. The power-supply device according to claim 2, further comprising:
    a voltage-divider circuit configured to generate a divided voltage by dividing the rectified voltage and apply the divided voltage as a reverse bias voltage to the constant voltage element.

4. The power-supply device according to claim 2, wherein
    the rectifier circuit outputs, as the rectified voltage, a positive voltage of a predetermined reference potential or more, and also outputs a negative voltage having a polarity opposite to that of the rectified voltage,
    the current detector circuit includes
        an operation amplifier including a non-inverting input terminal configured to receive the reference potential and an inverting input terminal configured to receive the negative voltage, and
        a resistor connected in parallel between the inverting input terminal and an output terminal of the operation amplifier, wherein
    the output terminal of the operation amplifier outputs a voltage corresponding to an amount of current flowing through the resistor, as the comparison voltage.

5. The power-supply device according to claim 2, wherein
    the rectifier circuit outputs, as the rectified voltage, a negative voltage of a predetermined reference potential or less, and also outputs a positive voltage having a polarity opposite to that of the rectified voltage,
    the current detector circuit includes a current detection resistor, one end of which the positive voltage is applied to and the other end of which the reference potential is applied to, and
    the one end of the current detection resistor supplies the comparison voltage.

6. The power-supply device according to claim 4, wherein
    the rectifier circuit includes
        a first half-wave rectifier element configured to generate the positive voltage by half-wave rectifying an alternating-current voltage outputted from the transformer, and
        a second half-wave rectifier element configured to generate the negative voltage by half-wave rectifying the alternating-current voltage.

7. The power-supply device according to claim 1, further comprising:
    a voltage-divider circuit configured to generate the comparison voltage by lowering the rectified voltage; and
    a current detector circuit configured to generate a voltage corresponding to the output current based on the rectified voltage outputted from the rectifier circuit, and apply the generated voltage as a reverse bias voltage to the constant voltage element, wherein
    the constant voltage element is electrically connected to the power-supply output terminal through the current detector circuit, and limits the output current by operating as the constant voltage source in response to the reverse bias voltage being applied when the output current value reaches the threshold.

8. The power-supply device according to claim 1, wherein the constant voltage element includes a zener diode.

9. The power-supply device according to claim 1, wherein
    the transformer is an electromagnetic transformer,
    a primary winding of the electromagnetic transformer is connected to the transformer drive circuit, and
    a secondary winding of the electromagnetic transformer is connected to the rectifier circuit.

10. The power-supply device according to claim 1, wherein the transformer is a piezoelectric transformer.

11. A power-supply device that supplies a load with power, comprising:
    a first transformer;
    a second transformer;
    a first transformer drive circuit configured to drive the first transformer;

a positive rectifier circuit configured to generate a positive rectified voltage of a predetermined reference potential or more by rectifying an output from the first transformer;
a second transformer drive circuit configured to drive the second transformer;
a negative rectifier circuit configured to generate a negative rectified voltage of the predetermined reference potential or less by rectifying an output from the second transformer;
a power-supply output terminal configured to supply the load with an output voltage and an output current based on any one of the positive rectified voltage and the negative rectified voltage;
a first comparator circuit having an input terminal to which a first indicator voltage is inputted, the first comparator circuit configured to compare a first comparison voltage corresponding to the output voltage or the output current with the first indicator voltage and to control an operation of the first transformer drive circuit so as to reduce a difference between the first comparison voltage and the first indicator voltage;
a first constant voltage element electrically connected to the power-supply output terminal and configured to limit the output voltage or the output current by operating as a constant voltage source when a value of the output voltage or the output current reaches a first threshold;
a first current mirror circuit connected in series with the first constant voltage element;
a first current path electrically connecting the first current mirror circuit to the input terminal of the first comparator circuit;
a second comparator circuit having an input terminal to which a second indicator voltage is inputted, the second comparator circuit configured to compare a second comparison voltage corresponding to the output voltage or the output current with the second indicator voltage and to control an operation of the second transformer drive circuit so as to reduce a difference between the second comparison voltage and the second indicator voltage;
a second constant voltage element electrically connected to the power-supply output terminal and configured to limit the output voltage or the output current by operating as a constant voltage source when a value of the output voltage or the output current reaches a second threshold;
a second current mirror circuit connected in series with the second constant voltage element; and
a second current path electrically connecting the second current mirror circuit to the input terminal of the second comparator circuit, wherein
the first current mirror circuit is configured to lower the first indicator voltage by allowing a current proportional to a current flowing through the first constant voltage element to flow through the first current path, and
the second current mirror circuit is configured to lower the second indicator voltage by allowing a current proportional to a current flowing through the second constant voltage element to flow through the second current path.

12. An image formation apparatus including a power-supply device and a print execution unit configured to form an image on a print medium by using the power-supply device, wherein the print execution unit includes a load, and
the power-supply device includes
a transformer,
a transformer drive circuit configured to drive the transformer,
a rectifier circuit configured to output a rectified voltage by rectifying an output from the transformer,
a power-supply output terminal configured to supply the load with an output voltage and an output current generated based on the rectified voltage,
a comparator circuit including an input terminal, to which an indicator voltage is inputted, the comparator circuit configured to compare a comparison voltage corresponding to the output voltage or the output current with the indicator voltage and to control an operation of the transformer drive circuit so as to reduce a difference between the comparison voltage and the indicator voltage,
a constant voltage element electrically connected to the power-supply output terminal and configured to limit the output voltage or the output current by operating as a constant voltage source when a value of the output voltage or the output current reaches a threshold;
a current mirror circuit connected in series with the constant voltage element, and
a current path electrically connecting the current mirror circuit to the input terminal of the comparator circuit, wherein
the current mirror circuit is configured to lower the indicator voltage by allowing a current proportional to a current flowing through the constant voltage element to flow through the current path.

13. The image formation apparatus according to claim 12, wherein
the power-supply device further includes a current detector circuit configured to generate, as the comparison voltage, a voltage corresponding to the output current based on the rectified voltage outputted from the rectifier circuit, and
the constant voltage element limits the output voltage by operating as the constant voltage source when the value of the output voltage reaches the threshold.

14. The image formation apparatus according to claim 12, wherein
the rectifier circuit outputs, as the rectified voltage, a negative voltage of a predetermined reference potential or less, and also outputs a positive voltage having a polarity opposite to that of the rectified voltage,
the current detector circuit includes a current detection resistor, one end of which the positive voltage is applied to and the other end of which the reference potential is applied to, and
the one end of the current detection resistor supplies the comparison voltage.

15. The image formation apparatus according to claim 12, wherein
the load is used in an electrophotographic image formation process.

* * * * *